United States Patent [19]

Norton

[11] Patent Number: 6,016,380

[45] Date of Patent: Jan. 18, 2000

[54] TEMPLATE-BASED EDIT DECISION LIST MANAGEMENT SYSTEM

[75] Inventor: Mark J. Norton, Bedford, Mass.

[73] Assignee: Avid Technology, Inc., Tewksbury, Mass.

[21] Appl. No.: 07/950,787

[22] Filed: Sep. 24, 1992

[51] Int. Cl.[7] .................................................... H04N 5/76

[52] U.S. Cl. .............................................. 386/52; 386/55

[58] Field of Search ..................................... 358/335, 311, 358/342; 348/552, 578, 458; 360/13, 14.1; 395/600, 162, 154, 117; 250/566; 386/46, 55, 65, 52; H04N 5/76

[56] References Cited

U.S. PATENT DOCUMENTS

| | | | |
|---|---|---|---|
| 4,297,729 | 10/1981 | Steynor et al. | 360/40 |
| 4,467,371 | 8/1984 | Kobayashi et al. | 360/14.3 |
| 4,521,870 | 6/1985 | Babbel et al. | 364/900 |
| 4,587,572 | 5/1986 | DiGiulio | 360/14.3 |
| 4,717,971 | 1/1988 | Sawyer | 358/342 |
| 4,746,994 | 5/1988 | Ettlinger | 360/13 |
| 4,899,370 | 2/1990 | Kameo et al. | 358/335 |
| 4,979,050 | 12/1990 | Westland et al. | 360/14.1 |
| 4,996,714 | 2/1991 | Desjadins et al. | 348/552 |
| 5,012,334 | 4/1991 | Etra | 358/102 |
| 5,051,845 | 9/1991 | Gardner et al. | 360/14.1 |
| 5,115,311 | 5/1992 | Jaqua | 348/458 |
| 5,206,929 | 4/1993 | Lanford et al. | 358/311 |
| 5,218,672 | 6/1993 | Morgan et al. | 395/162 |
| 5,227,643 | 7/1993 | Craig et al. | 250/566 |
| 5,239,622 | 8/1993 | Best et al. | 395/117 |
| 5,262,865 | 11/1993 | Herz | 358/181 |
| 5,267,351 | 11/1993 | Reber et al. | 395/600 |
| 5,283,819 | 2/1994 | Glick et al. | 348/552 |
| 5,307,456 | 4/1994 | MacKay | 395/154 |
| 5,355,450 | 10/1994 | Garmon et al. | 395/162 |
| 5,388,197 | 2/1995 | Rayner | 395/154 |
| 5,467,275 | 11/1995 | Fasciano et al. | 364/514 |
| 5,519,828 | 5/1996 | Rayner | 395/161 |
| 5,568,275 | 10/1996 | Norton et al. | 386/52 |

FOREIGN PATENT DOCUMENTS

WO/93/21636  10/1993  WIPO .
WO/94/01971  1/1994   WIPO .

OTHER PUBLICATIONS

H. Fix et al., "Design Criteria of Video Post Production Systems with Optimum Operation al Editing Convenience," SMPTE Journal, vol. 88, pp. 486–490, Jul. 1979.

Y. Fujimura et al., "An Automatic Video–Tape Editing/Splicing System Using a Process Computer," Journal of the SMPTE, vol. 76, No. 3, pp. 169–176, Mar. 1967.

Adobe Sytems, Inc., "Adobe Premiere 2.0 Offers Professional Features with Plug–In Interface to High–End Video Editing Sytems," Business Wire, 1992.

Arthur Schneider, "Edit List Management," SMPTE Journal, vol. 88, pp. 538–542, Aug. 1979.

Stanley D. Becker, "Simultaneous Release on Film and Tape Off–Line EDLs," BME, pp. 34–38, Nov. 1988.

(List continued on next page.)

*Primary Examiner*—Huy T. Nguyen
*Attorney, Agent, or Firm*—Wolf, Greenfield & Sacks, P.C.

[57] ABSTRACT

A computer-based system for generating a video edit decision list, which tabulates video editing events and video synchronization points corresponding to the video editing events. The invention accepts a sequence of video and audio manipulations produced by a digital video editing system, each manipulation effecting a particular video editing event, and generates, based on the manipulation sequence, a list of video editing events and corresponding synchronization points. The invention then conforms the list to a user-specified format selected from a plurality of video edit decision list format templates, provided by the system, which each specify a model for defining video editing events distinctly in that format, and then the video edit decision list is output in the user-specified format. The invention is adapted to also convert a video edit decision list from a first format to a second, user-specified format; and further is adapted to generate a sequence of video and audio manipulations to be used by a digital video editor for editing a video, based on a video edit decision list.

38 Claims, 4 Drawing Sheets

OTHER PUBLICATIONS

Mark Schubin, "The Rise of Random Access," Videography, pp. 25–32, Aug. 1989.

Eric C. Peters et al., "A Real Time, Object Oriented, Non–Linear Editing System for Film and Video," 131st SMPTE Technical Conference, Oct. 1989.

Shotlister 4, "Saves Time and Money in Post Production," Marketing Brochure, undated (prior to Sep. 1992).

Solo, "Edit Decision List Conversion Program," Abekas A34: Solo EDL Conversion Program, pp. 1–5, (prior to Sep. 1992).

SMPTE Standard for Television—"Transfer of Edit Decision List," SMPTE 258M, 1992, pp. 1–36.

Abekas Video Systems, Ltd., A34—Solo, "Edit Decision List Translator," Aug. 1990.

Videofonics, Inc., "An Editor's Guide to VUES Integrated Digital Post–Production," Version 2.0, Jan. 1991, pp. 1–31.

AMPEX Corporation, ACE 200, "Section 7—Dedicted Keyboard System Advanced Features," (prior to Sep. 1992).

Digital F/X, Inc., "Overview Edit List Exporter for CMS 340 and 3600 Formats," May 1990, pp. 1–60.

CMX OMNI 500, "Compact Online/Offline Editing From CMX," brochure.

CMX "Introducing the . . . AEGIS," CMX Newsletter, NAB, Apr. 1993, brochure.

AMPEX, "ACE 25 Computerized Editing System—Operation," Catalog, Section 4, Sep. 1988, pp. 4/1–4/12.

AMPEX, "ACE 25 Computerized Editing System—Operation," Catalog, Section 6, Sep. 1988, pp. 6/1–6/8.

Ampex, ACE 25 Version 3.1, "Appendix E: EDL Transfer Settings—Part 1," Engineering Bulletin, Jul. 1990, pp. 12–19.

TEMPLATE-BASED EDIT DECISION LIST MANAGEMENT SYSTEM

BACKGROUND OF THE INVENTION

1. Field of the Invention

This invention relates to systems for and methods of generating and manipulating edit decision lists which corresponds to edit events of a video which has been digitally edited; and particularly relates to systems and methods for managing edit decision lists having dissimilar formats.

2. Description of Related Art

The edit decision list (EDL) was developed by the CMX Corporation around 1974 for use with the CMX on-line video editor, the CMX 340, which digitally edits a video or a video version of film. The EDL is created as a record of the digital video editing and is thereby a means of capturing, defining, and recording the editing decisions made during a video editing session for use at a later time to, physically conform a film to the edit decisions, or to create a duplicate of the edited video. The EDL is a formatted list of the editing "events" defined during an editing session. Each "event" is a single editing action, such as a cut, dissolve, or wipe. The EDL contains all data necessary to uniquely describe each event.

Use of EDLs as a video editing record has been widely accepted by manufacturers of digital video editors. While a few video editors produce EDLs in a format which is closely compatible with the CMX EDL format, many video editors use a modified EDL format to represent features unique to their editing systems. This has led to a proliferation of diverse EDL formats.

The diversity of EDL formats has led to problems in recreating editing decisions on systems other than that on which an EDL was originally created. Incompatibility of formats is problem when, for example, a variety of off-line editors are used to generate EDLs for a single on-line editor. Even video editing systems which claim to produce CMX-compatible EDLs include format variations relating to the amount and accuracy of information represented in those systems.

Several commercial EDL management and conversion utilities exist, for example, these three utilities: Shot Lister, SEDL, and EDL TRANSform, which is sold by Amtel, Inc. Typically, These utilities accommodate only a fixed set of EDL formats, which are directly supported in software, with no mechanism for extending of changing to additional formats. TRANSform is an exception in that this system allows EDL formats to be defined by a C scanf specification, to thereby accommodate a range of existing EDL formats. However, this system has many deficiencies. For example, TRANSform can not process editing events which require several lines of code to describe them, and does not allow for optional elements of events, concatenated event description fields, events other than cuts, or well-known spacing. Furthermore, the system is based on a cumbersome protocol which is quite difficult for a user to understand. The present invention addresses all of these deficiencies.

SUMMARY OF THE INVENTION

In general, in one aspect, the invention provides a computer-based system for generating a video edit decision list, which tabulates video editing events and video synchronization points corresponding to the video editing events. The invention accepts a sequence of video and audio manipulations produced by a digital video editing system, each manipulation effecting a particular video editing event, and generates, based on the manipulation sequence, a list of video editing events and corresponding synchronization points. The system of the invention then conforms the list to a user-specified format selected from a plurality of video edit decision list format templates, provided by the system, which each specify a model for defining video editing events distinctly in that format. The system then outputs the video edit decision list in the user-specified format.

In preferred embodiments, the invention further comprises storage for storing the plurality of format templates in a template library on a hard disk or floppy disks. The system outputs the video edit decision list via a hard copy, a computer text file, or is sent onto a serial output port.

In general, in another aspect, the invention provides a computer-based system for converting a video edit decision list from a first format to a second, user-specified format. In the invention, the system accepts the video edit decision list in a first user-specified format, and generates, based on the list, a format-independent sequence of video and audio manipulations' which each correspond to a particular video editing event in the list. The system then generates, based on the manipulation sequence, a list of editing events and corresponding synchronization points, and conforms the list to a second user-specified format, selected from a format template library, and then outputs the conformed edit decision list, thereby converting the list from a first format to a second format.

In general, in another aspect, the invention provides a computer-based system for generating a sequence of video and audio manipulations to be used by a digital video editor for editing a video, each manipulation effecting a particular video edit event, based on a video edit decision list. In the invention, the system accepts the video edit decision list in a first user-specified format, and generates, based on the list and the particular format of the list, the sequence of video and audio manipulations which each correspond to a particular video editing event in the list, using a corresponding format template from a video edit decision list format library. Finally, the system makes the completed sequence available to the digital video editor.

Template-based video edit list generation and importation as achieved by the invention provides significant advantages over traditional methods of video edit list management. By saving all descriptive information in a scheme which can be edited by a human and read by a machine, adjustments can be made to existing edit formats, and new formats can be rapidly added to the system by creating a new template. These features combine to form a system which allows rapid response to customer problems, improved maintenance, and site customization.

DESCRIPTION OF A PREFERRED EMBODIMENT

Figure 1:
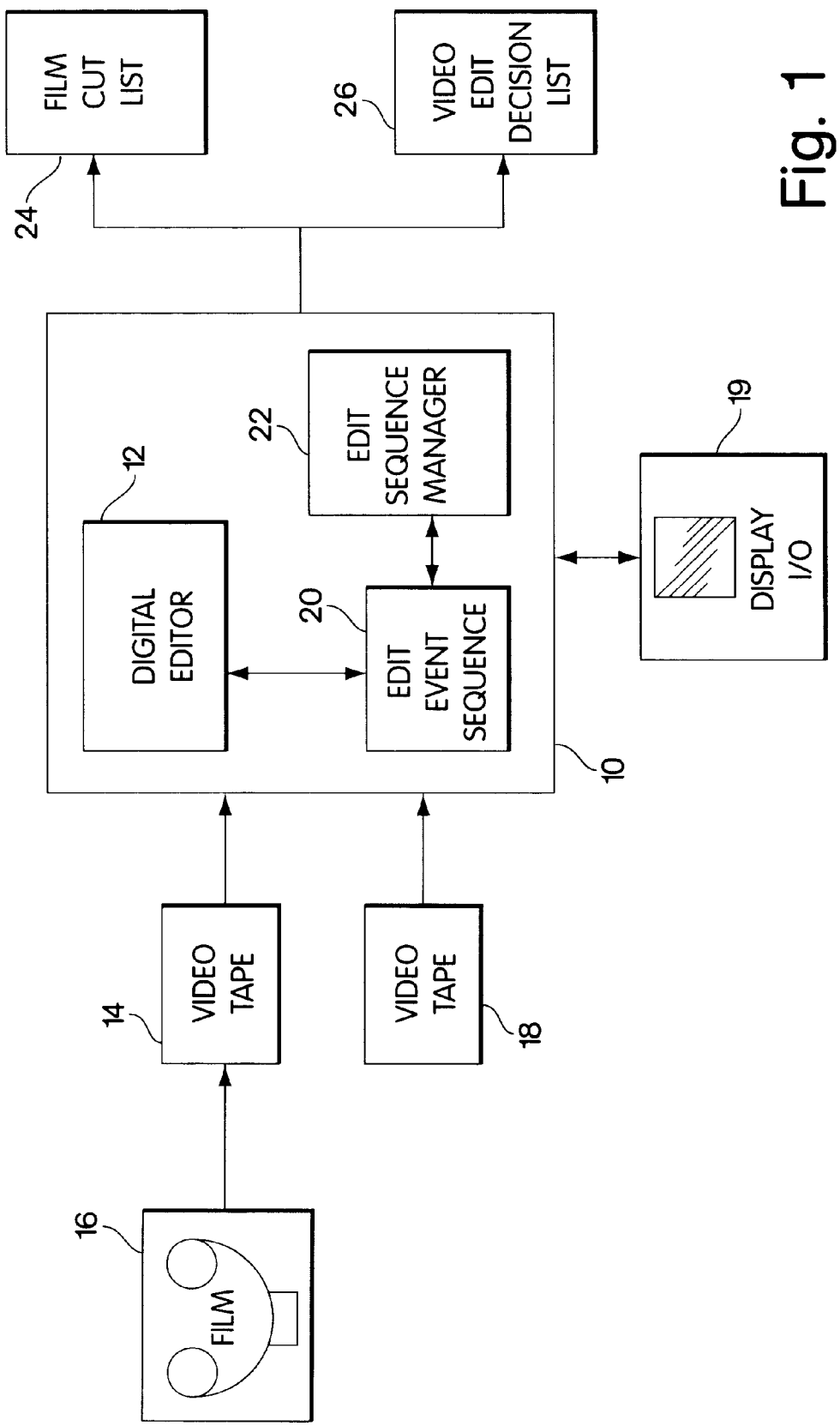
FIG. 1 is a block diagram of an editing environment in which the edit list management system of the invention may be implemented.

There is shown in FIG. 1 an off-line, digital video editing computer system 10, including a digital editor 12 for editing digitized versions of video or digitized video version of film. The editing system 10 provides digital editing capabilities for editing a video version 14 of a source film 16, and provides digital editing capabilities for editing a source video 18. The digital editing system provides user I/O via a display 19 that supports and displays a graphical user interface, and which may include other suitable components, e.g., keyboards, a mouse, etc. The I/O system additionally includes a printer for producing hard copies of the editing functions, as described below. The Avid MediaComposer™, available from Avid Technology, Inc., of Tewksbury, Mass., is one such off-line video editor.

As a source video or video version of a source film is edited on the MediaComposer™ a digital editor 12 of the system keeps a dynamic account of each edit event and the synchronization point at which that event occurs. The set of edit events which describe an entire video edit comprise an edit event sequence 20, which the digital editor creates, dynamically updates, modifies stores and displays for an editing user. The edit list manager of the invention 22 processes the edit sequence 20 to provide the user with a record of the edit events corresponding to the edit decisions which were made using the editing system.

The MediaComposer™ provides two alternative types of edit event records. The first, a film cut list 24, based on a metric length, specifies film footage points for each edit event. This cut list is used to directly manipulate a source film 16 and thereby produce an edited film version. The second type of edit event record, an edit decision list 26, is based on a video time code points at which edit events occur. This edit decision list (EDL) is used to produce an edited version of a source video or a videotape version of a source film including the edits created by the editing system. The EDL is particularly useful for creating a so-called "rough cut", a videotape of an unfinished or unapproved film edit versions; the rough cut provides the ability to view the edited film without actually physically producing the edits. More importantly, perhaps, an EDL is required for some media applications, such as the television market, in which video, rather than film, is needed for producing the final media product.

As explained above in the Background discussion, different video editing systems are based on distinct and incompatible EDL syntaxes and formats. An EDL in the CMX format, including a typical set of video "cuts" is illustrated in Appendix A. The first entry of this EDL is reproduced below:

```
0001 001 AA/V  C  04:00:00:00 04:00:23:27 01:00:00:00 01:00:23:2
```

Each column of the above edit entry represents one piece of information for this "cut": column 1—the edit event number in the sequence of edit events; column 2—the identifying number of the video source for this edit; column 3—the mode of video and audio combination being manipulated by the edit event; columns 4 and 5—the start and stop synchronization time codes, respectively, for the source tape; and columns 6 and 7—the start and stop synchronization time codes, respectively, for the edit corresponding to the recording tape.

The edit list manager 22 of the invention provides an application environment which supports any EDL produced by any editing system. Thus, the invention bridges the gap between the various incompatible formats and provides a scheme that allows one video to be edited by several, perhaps incompatible, editing systems.

There are three primary editing scenarios which are accomplished by the edit list manager of the invention, but other editing scenarios may also be supported. In a first scenario, a video is edited on the digital editing system 10, thereby creating an edit event sequence 20; the edit list manager 22 processes the sequence 20 and generates the text of an EDL in any user-specified format. In a second editing scenario, an EDL (in any format) is input to the edit list manager 22, which creates a corresponding edit sequence to be applied to an input source video or video version of a source film. This scenario allows one video to be edited using several editing tools. In the third editing scenario, an EDL in a first format is input to the edit list manager 22, which converts the format to that specified by the user. Each of these three edit scenarios is described in detail below.

The edit list manager may be implemented as an integral component of a digital editing system, or it may alternatively be implemented as a separate stand-alone processor. It may also be installed as part of an on-line system. In any case, the fundamental operational scheme is the same.

This operational scheme is based on an EDL representation language which is both human- and machine-readable and is a code-independent intermediate form between that of an EDL and the manipulation representations of an edit event sequence. Being human-readable, this EDL representation language is easy to use and maintain, and is flexible and extendable, thereby overcoming the rigidity and limitations of existing EDL handling schemes.

In the edit list manager of the invention, each EDL format of interest is defined by the EDL representation language to uniquely specify that format's characteristics and edit events. This is achieved using an EDL format template which is tailored for each format. Once constructed, the set of EDL format templates may be supplemented, edited, or extended as various EDL formats are instituted and evolve.

Depending on the implementation and configuration of the edit list manager, the EDL format templates may be stored individually or collectively, on remote storage devices, such as a hard disk, optical disk, or floppy disks, or may be provided in internal memory of the manager. Other suitable storage techniques are also feasible, such as through a networked data server.

Figure 2:
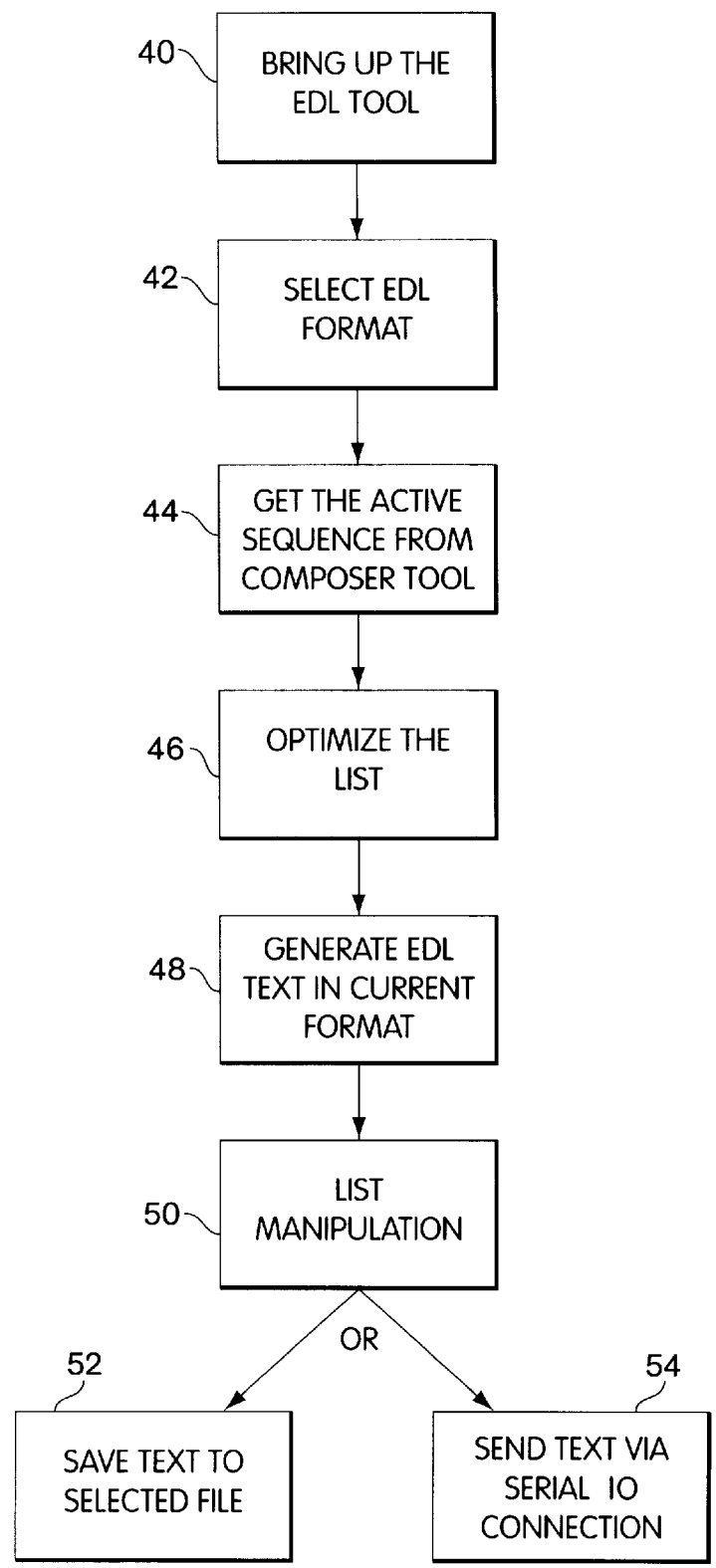
FIG. 2 is a flow chart illustrating the steps performed by the management system of the invention to generate the text of an edit decision list, based on an edit event sequence, in any user-specified edit decision list format.

Referring to FIG. 2, in an editing scenario in which a source video is edited by the digital editing system, the edit list manager of the invention captures the resulting edit sequence and produces a corresponding EDL in a format specified by the user. The user first initializes 40 the manager tool and then, through the use of menu driven queries and responses, selects 42 the desired format for the EDL which the system will generate. The manager then captures 44 the active edit event sequence which was produced by the digital editor to create an edit event list, and then optimizes 46 the list based on the user's preferences. The optimized list is then processed to generate 48 text for an EDL in the specified format, which may then be manipulated 50, again based on preferences of the user. The resulting EDL is then either saved 52 as a text file, or sent 54 via a serial I/O connection to another system. In addition, the resulting EDL may be printed out as a hard copy for the user, or may be produced in some other suitable medium.

Figure 3:
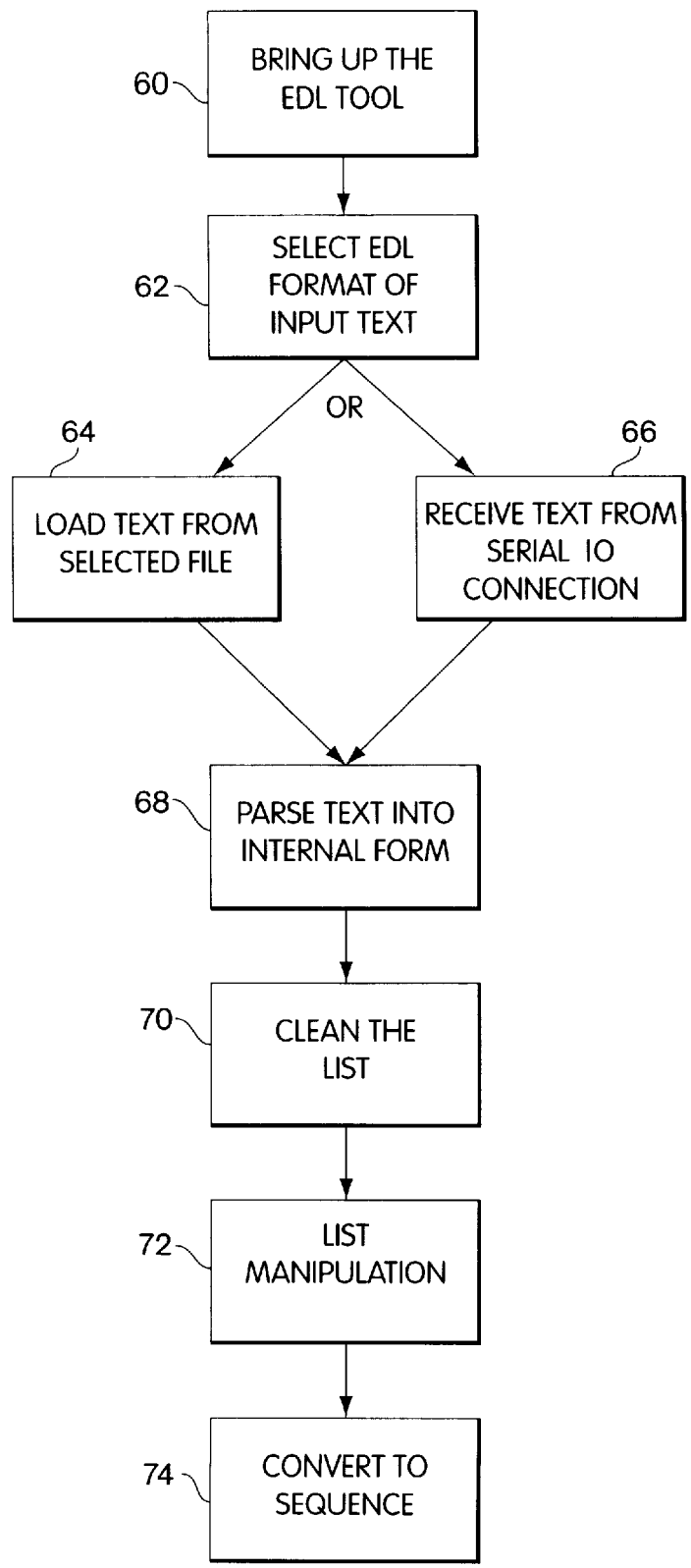
FIG. 3 is a flow chart illustrating the steps performed by the management system of the invention to import the text of an existing edit decision list, in any user-specified format, and to create a corresponding edit event sequence.

Referring now to FIG. 3, in an editing scenario in which an existing EDL is to be applied to a video in the digital editing system, the edit list manager of the invention imports the EDL text, which may be in any format, and parses the EDL to provide the editing system with the corresponding edit event sequence. The user first initiates 60 the sequence management tool, and then indicates 62 the format of the EDL text to be imported. This text may either be loaded 64 from a selected data file, or received 66 from a serial I/O port. The imported text is parsed 68 by the manager to create an internal listing of the editing events; this list is "cleaned" 70 to strip it of any format-specific characteristics. The list is also manipulated 72 based on the characteristics of the format. Once this is accomplished, the listing is converted 74 to an edit event sequence for the digital editing system to apply to the video.

Figure 4:
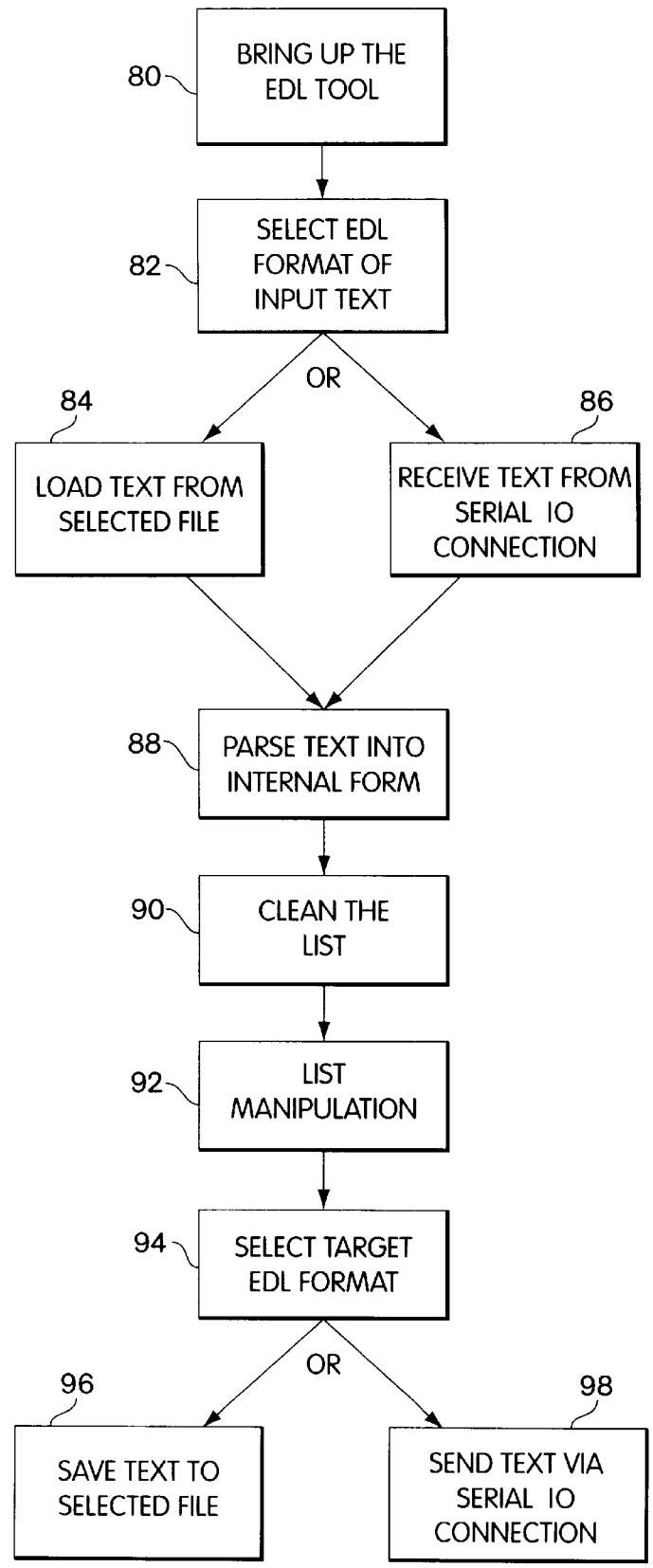
FIG. 4 is a flow chart illustrating the steps performed by the management system of the invention to convert the format of an existing edit decision list from a first format to a second format.

Referring to FIG. 4, in a scenario in which an existing EDL is to be reformatted from a first format to a second, the edit list manager of the invention imports the EDL, and then based on the user's specifications, parses and reformats the EDL, which is then output as EDL text for the user. The user first initiates 80 the EDL sequence tool, and then indicates 82 the format of the EDL to be reformatted by the system. The input EDL may be imported via transfer 84 from a test file, or received 86 from a serial I/O connection port. The management system parses 88 the input EDL to create an internal form of the edit events represented by the EDL, and then cleans 90 and manipulates 92 the list to remove any format-specific characteristics. A second, target EDL format is then specified 94 by the user for the system to correspondingly manipulate the internal listing and generate the EDL text in that format. Once this EDL text is generated, the completed EDL may be saved 96 to a selected text file, or sent 98 to some other system via a serial I/O connection port. As in the first scenario, a hard copy of the completed EDL may alternatively be provided for the user.

The base template from which each EDL format template is generated consists of a control section, called the EDL_Base, and two lists: a tape name table, and a list of entries each corresponding to one edit event. The control block structure holds global variables and flags which indicate and control particular semantic choices for a given EDL format. The tape name table provides an internal correspondence for tape sources, and thus consists of variable identifiers. The edit event entry list structure, which is a doubly linked list, holds templates, which are strings each uniquely defining an edit event, and maps, which are variable components of a template.

A complete EDL template thus is structured as follows:
ROOT CONTROL BLOCK:
Control parameters
Serial I/O parameters
MASTER TEMPLATE
Header
Title
EDIT EVENT LIST
Edit entries such as:
　Dissolve
　Wipe
　Key
　Cut
　Directive
　Comment Together, a control block, tape name table, and edit event entry list comprise a constrained description data tree, with the control block at the root of the tree as a single control node. The templates in the event entry list represent logical AND nodes in the tree and the maps in each template represent logical OR nodes in the tree. Due to a limitation on the tree structure, a map element may not directly contain another map element; however, a map element may contain a template element which consists of a map. The description tree supports only forward references within each node, and does not support definitions which are not referred to. Leaf nodes in the description tree are always strings or variable references. The edit list manager, which itself is EDL format-independent, is designed to process an EDL or event sequence based on specified EDL template control block, templates, and maps, and is therefore streamlined because each EDL format is not centrally described.

Each EDL description data tree is field-oriented, such that the description of an editing event is not constrained to occupy a single line of description code. Events whose descriptions require multiple lines, such as dissolves or splits, can be described by using a terminator keyword at the end of the first description line. With this keyword, the edit list manager is instructed to continue past the end of the line to the next line, which is considered a part of the same event description code during an EDL parsing operation.

The EDL description data tree provides particular advantages. It can be manipulated to change assembly order (C mode, for example), and changes to an EDL format, such as a new master record time, can be rapidly rippled through the description. Various kinds of information can be selectively displayed and hence saved as part of the EDL. This information might include comments, directives, audio notes, clip name notes, patching information, etc. Dupe and effects reels are also generated and can be saved independently or combined within the description.

The control block of the description tree consists of one or more entries, with each entry comprising one line in length. The control parameters specify how certain format-dependent choices are resolved. These parameters include frame code mode, split handling, case conversion, timecode format, and file data format, e.g., parity, header, trailer, etc. Serial I/O parameters, e.g., rate, width, parity, stop bits, and handshaking, allow customization of a serial data line in a particular installation.

Each entry in the control block contains fields consisting of a variable name and a value to be assigned to that variable. These values are then fixed for the particular format specified by the control block and are not altered while an EDL is processed based on that template. Variable types are defined in the parser/generator code of the management system and determine what type of variable value is expected for each variable. Legal variable types include a string, variable, long, boolean, and timecode. The control block also indicates what EDL optimizations are supported for the given format, and other format-wide specifications.

Control blocks may also contain a reference to a template or map used in the corresponding edit event list. One such template is the "MASTER" template, which is the template for the EDL format being described. Another reference might be to a "wipe" equivalence table in the form of a map.

Currently, only one control block is allowed in a format description, and must appear as the first definition in the format description.

The following is an example of a control block for the CMX-340 EDL format.

```
CONTROL ROOT:
  fem_override              TRUE
  handle_split_in           TRUE
  handle_split_out          FALSE
  toupper_conversion TRUE
  max_reel_number 999
  format_name               "CMX 3400"
  randomization_factor 0.5
  @MASTER                   "CMX 3400"
  @WIPE_TABLE               "CMX 3400"
```

The complete set of entries (and their definitions) which may form a control block are given in Appendix B.

Turning to the list of edit event entries within the format template, this list is a doubly linked list of fixed entries. Each entry is considered to be one edit event. For generation purposes, the order of the list is determined by the link order. Entries may contain smaller entry lists where comments and directives may be stored. This feature allows the list to be sorted by events and to keep comments or other information correlated with the events.

Each event entry in the edit event list comprises a template. Thus, a template is used to define a string of edit event components to be matched in an EDL parsing operation or is what gets generated in an EDL generation operation. A template consists of one or more fields, each field on its own line. Entries may consist of alphanumeric characters and underbars (_). Each entry may be up to 63 characters in length. A template field may be a literal string, a variable name, or a reference to another template or map. Literal strings are denoted by double quotes. Variable names are predefined in the edit list manager system. References to other templates or maps within a given template are indicated by prefixing a at-sign (@) before the referenced item.

Template fields may be optionally followed by a decimal number which denotes the amount of white space to be added after the text field is written when the EDL is generated. One space is always generated and must be kept track of in calculating spacing. Template fields may also be concatenated, in which case no space is provided. Some templates include optional fields, in which the decimal number represents a number of spaces to be generated rather than a variable value.

The following example of a template directly corresponds to the CMX EDL entry shown above, a cut entry.

```
TEMPLATE cut:
  event
  @source
  @mode
  "C"              8
  a_src_st
  a_src-end     1
  rec_st
  rec_end
  TERM
```

This cut template contains nine fields. The first field is a reference to the "event" variable, which was a "1" in the EDL cut listing given. This variable at generation time is the event number. The second field is a reference to the source map definition. The third field is a reference to the mode map definitions of the audio video combination. The fourth field is a literal string containing "C" which is followed by a total of nine spaces. The last field in the definition is a reference to a terminator character. This is necessary in the event definition for two reasons. First, some template entries are multi-line in nature. Second, some formats call for a carriage return and others for a carriage return/line feed pair. The terminator character allows an EDL to be parsed independent of format, yet allows the proper line terminator characters to be generated.

Fields within the template definition are normally white-space delimited tokens, or text with a leading and trailing space. Fields may be concatenated by using the concatenation operator at the end of the field. This is illustrated by the following example.

```
TEMPLATE wipe_field:
  "W"+
  wipe_code
```

Here, the wipe field is defined as a single character string (W) followed by a wipe code which is not separated by white space. All known EDL formats have at least one instance where this is necessary. The space parameter has no meaning on a field to be concatenated because this operation means no space is to be generated.

During a parsing operation, template strings are matched with all leading and trailing spaces removed. This permits matching without regard to exact spacing of the template. Template string spaces are preserved in the template to allow proper spacing of fields when an EDL is generated.

In some cases, it is necessary to indicate that a field is repeated one or more times in a template description. This is denoted by surrounding the field in angle brackets. The top level template definition of the CMX EDL is an example of this:

```
TEMPLATE MASTER:
  @header
  <@entry>
```

In some cases it is necessary to indicate that a field is optional in a template description. This is denoted by surrounding the field in parenthesis. There are no examples of this in CMX-340 EDL, but the following might occur:

```
TEMPLATE wipe_field:
  "W"+
  wipe_num+
  (@wipe_edge)
```

Appendix B lists all possible template variables and their definitions, as well as reference words and defining symbols.

Within each template, maps set up a relationship between enumerated variables and sets of strings for edit components. For example, the fcm_mode map variable has three known values: "none," "drop," or "non-drop." During import of an EDL, each map string is recognized, and the value associated with it is saved as a variable. During generation of an EDL, strings replace the corresponding value from an edit event sequence. A map consists of one or more entries, each entry on its own line. An entry may be a literal string, a variable name, or a reference to another template or map. Literal strings are denoted by double quotes optionally followed by a concatenation operator. Variable names are pre-defined by the edit list manager. References to other templates and maps are denoted by prefixing an at-sign (@).

The following is an example of a map. The example is the definition of the audio/video mode field referred to in the cut template above.

| MAP mode: | |
|---|---|
| "V" | 1 |
| "A" | 2 |
| "A2" | 3 |
| "B" | 4 |
| "A2/V" | 5 |
| "AA" | 6 |
| "AA/V" | 7 |

This mode map contains seven entries. The string "V" corresponds to a value of one in the mode variable, while the string "AA/V" corresponds to a value of seven. Entry definitions do not have to be consecutive, but they must be ordered by increasing value. Empty strings are valid.

Concatenation of map entries must be indicated in the map itself. This is due to the lack of inheritance of template properties by its parts. The following correct example comes from the Paltex EDL template:

TEMPLATE fcm_temp:

| | | |
|---|---|---|
| @fcm_a | | |
| @fcm_b | | |
| @fcm_r | | |
| MAP fcm_a: | | |
| "N"+ | 0* | Concat op at this level, |
| "D"+ | 1* | not the one above. |
| "N"+ | 2* | Each entry must have op. |
| MAP fcm_b: | | |
| "N"+ | 0 | |
| "D"+ | 1 | |
| "N"+ | 2 | |
| MAP fcm_r: | | |
| "N"+ | 0 | |
| "D"+ | 1 | |
| "N"+ | 2 | |

In order to allow descriptive and clarifying information to be directly included in format descriptions, comments are provided within the edit event description tree. A comment line starts with an asterisk and extends to the end of the line. Comments can also be appended to any other description or definition line. They should be separated by white space, followed by an asterisk, and comment text, which extends to the end of the line.

Information included in comments is discarded at the time an EDL is created based on a format template, and has no effect on format description. Examples of comments include:

| | | |
|---|---|---|
| *Main event types. | | |
| MAP entry: | | |
| @cut | 1 | * A cut event. |
| @dissolve | 2 | * A dissolve event. |
| @wipe | 3 | * A wipe event. |

Appendix B lists all possible map variables and definitions. Appendix C illustrates the entire format template for the CMX-3400 EDL format; each template in this format is prefaced with a comment which explains the corresponding edit event.

Based on this description of EDL formats, the following three sequences detail the methods by which the edit event manager of the invention achieves the three scenarios described above, namely, EDL text generation based on an edit event sequence, EDL text importation and edit event list generation, and reformatting of an EDL from a first format to a second format.

EDL Text Generation From an Edit Component Sequence
I. Pull the active edit sequence object from the editor environment.
II. If an old EDL_Base is keyed into the management system, dispose of it.
III. Determine which channels should be present in the EDL events corresponding to the edit sequence.
IV. Convert the sequence object to a linked list EDL record and save the conversion results in a new EDL_Base structure as the Master List:
  A. Initialize local track mapping;
  B. Initialize the starting reel id number;
  C. Allocate a new EDL_Base structure space;
  D. Initialize the record start time in the Base;
  E. Initialize the record frame code mode in the Base;
  F. Retrieve the sequence name and initialize the title string in the Base:
    1. Create the Master List root entry by allocating an EDL record;
    2. Initialize the entry record start to the record start timecode in the Base;
    3. Initialize the record entry type as a title directive;
    4. Copy the title string from the Base to the root's comment string buffer;
  G. For each component in the edit component sequence:
    1. Allocate a new list entry;
    2. Specify the entry duration in frames by retrieving the component length;
    3. Specify the entry A source tape name start timecodes given by the component;
    4. Specify the entry record start and end timecodes using the Base record start;
    5A. If this component is a graphics overlay:
      a. Default the entry type to key and set the channel mode to video;
      b. Retrieve the source id and save it as a tape name table pointer in the event record;
      c. Set the A source tape as being black;
      d. Specify the key type;
      e. Retrieve the overlay modifier object from the sequence;
      f. Specify the fade up duration from the modifier object;
      g. Specify the fade down duration from the modifier object;
      h. Adjust the source timecodes if necessary;
      i. Retrieve the picture offset from the modifier object;
      j. Retrieve the picture destination from the modifier object;
    5B. If this component is not a graphics overlay:
      a. Specify the key fade up duration equal to zero;
      b. Specify the key fade down duration to zero
    6. Specify the channel mode to video if the sequence component is video;
    7. If audio is present, retain the track mapping information for patch data;
    8. Specify the event type as "cut" as a default value;
    9. Retrieve the A source tape name identifier and save it in the record;
    10. Retrieve the transition effect modifier object from the edit sequence;
    11. If a transition effect is present:
      a. Specify the A source tape name start and end timecodes;
      b. Specify the B source tape name start and end timecodes;

c. Save the effect's source references in a computed media record;
d. Retrieve and save the A and B source tape name identifiers;
e. Save the transition offset from the transition effect object;
f. If the effect is a "dissolve", determine its type;
g. If the effect is a wipe:
  i. Determine the wipe type and retrieve the wipe code;
  ii. Map the SMPTE wipe code to a target code;
  iii. Save the reverse flag;
12. Retrieve the motion effect modifier object from the sequence;
13. If the effect is a motion control effect;
  a. Save the motion speed;
  b. Save the motion direction sign;
  c. Adjust the source timecodes if necessary;
  d. Save the strobe rate if there is any;
  e. Specify the motion effect flag;
14. Retrieve the comment modifier object from the sequence;
15. If a comment is present in the object, save it in the event record;
16. If a comment exists that exceeds 200 characters, truncate the comment;
17. If a GPI trigger comment exists, extract GPI data and save it in a GPI sub-record;
18. Save any channel patching information in the event record;
19. Retrieve the clip name from the component sequence object and save it;
20. Retrieve the audio modifier object;
21. If audio data is present:
  a. Retrieve the volume levels for the channel;
  b. Retrieve the pan settings for the channel;
22. Save the freeze frame indicator;
23. Update the Base channel set;
24. Link the new entry into the Base list;
H. Add the newly created list to the Base structure;
I. Update the tape names;
V. Specify the text of the EDL title from the name of the sequence object;
VI. Initialize list characteristics from the control section of the corresponding EDL template;
VII. Assign initial event numbers to the records in the Master List;
VIII. Optimize the Master List, if so specified by the user:
  A. Sort the list;
  B. Extract graphics from the list, if present;
  C. Merge all adjacent edit event entries;
  D. Merge channels, where appropriate;
  E. Merge graphics, if present;
  F. Create split edit entries;
IX. Update the data in the Master List;
X. Combine directives in the Master List, where for each directive, merge the following into its associated event entry:
  A. Freeze frame comments
  B. Clip name comments
  C. Patch comments
  D. Graphic offset comments
  E. Audio comments
  F. Strobe motion notes
  G. True speed notes
  H. SMPTE comments
  I. FCM directives
  J. Motion control directives
  K. Audio ¾ notes
  L. GPI directives
XI. Determine if delayed keys need to be split;
XII. Assign final event numbers to records in the Master List;
XIII. Sort the Master List unless the mode is specified as A mode;
XIV. Generate FCM directives in the Master List if they are called for by the template by adding an FCM directive whenever the frame code mode changes between events;
XV. Expand comments and directives in the Master List by creating the following directives if called for by the user:
  A. Freeze frame comments
  B. Clip name comments
  C. Patch comments
  D. Graphic offset comments
  E. Audio comments
  F. Strobe motion notes
  G. True speed notes
  H. SMPTE comments
  I. FCM directives
  J. Motion control directives
  K. Audio ¾ notes
  L. GPI directives
XVI. Create a dupe reel creation list from the Master List if such is requested by the user whereby, for each event in the master list:
  A. If the event contains a graphic source, create an entry in the effects reel list;
XVII. Create the tape name to reel id assignment table is requested by the user;
XVIII. Create an entry for each entry in the tape name table;
XIX. Generate the EDL text for each list in the EDL_Base:
  A. Mask out the mode field of each event with the channels currently selected;
  B. Find the currently selected template;
  C. Load the template into memory, if not loaded;
  D. Using the header section of the template, generate the EDL header;
  E. For each event in the list, recursively step through the EDL description tree and check for each of the following conditions:
    1. If the entry is a "template" check for the following:
      a. If the template is a static string, write it;
      b. If the template is a variable:
        1. Determine the variable type code;
        2. Determine the variable;
        3. Write the variable value based on its type;
      c. If the template calls for concatenation, do not write a space at the end of the entry, or else write one space plus additional spaces per template;
      d. If the template is a map, select the sub-template based on the map value;
XX. Display the resulting EDL lists on the system monitor;
XXI. Send the EDL text to the user-specified format, being one of the following:
  A. Computer file
  B. A CMX or GVG diskette
  C. A Sony or Macintosh diskette D. RS-232 Serial transmission line to an on-line video editing system.

EDL Text Import and Creation of an Edit Event Sequence

I. Retrieve the input text name;
II. sprintf (edl_name, "default name")
III. Load the EDL text from the user-specified source, being one of the following:
   A. Computer file;
   B. CMX or GVG diskette
   C. Serial RS-232 connection
IV. Free the old EDL_Base;
V. Parse the EDL text to produce a new list:
   A. Parse the header section of the list according to the corresponding header template;
   B. Recursively step through the event description tree and check for the following:
      1. If the entry is a "template", check for the following:
         a. If the template is a static string, compare it to the current written sequence for a match, in which case step to the next written sequence and template;
         b. If the template is a variable:
            1. Determine the variable type code;
            2. Determine the expected variable;
            3. If the variable and its type match, then save the value in the EDL record and step to the next written sequence and template;
         c. If the end of the EDL description tree is reached with all matches, save the event and create a new event entry;
         d. If a match is not reached, step backward to the previous starting point of the written sequence, and parse the sequence using the next entry;
         e. If no match is reached in the entire description tree, save the EDL text as an error entry;
      2. If the entry is a map;
         a. Attempt to match the map components to entries in the description list as above;
         b. When a match occurs, save the amp value in the map variable;
VI. Update the EDL_Base with attributes;
VII. Update the start timecode gadget;
VIII. Determine the channel mask and update the channel selector;
IX. Remove FCM directives from the Mater List;
X. Combine directives in the Master List, where for each directive, merge the following into its associated event entry:
   A. Freeze frame comments
   B. Clip name comments
   C. Patch comments
   D. Graphic offset comments
   E. Audio comments
   F. Strobe motion notes
   G. True speed notes
   H. SMPTE comments
   I. FCM directives
   J. Motion control directives
   K. Audio ¾ notes
   L. GPI directives
XI. Optimize the Master List, if so specified by the user:
   A. Sort the list;
   B. Extract graphics from the list, if present;
   C. Merge all adjacent edit event entries;
   D. Merge channels, where appropriate;
   E. Merge graphics, if present;
   F. Create split edit entries;
XII. Generate FCM directives in the Master List if they are called for by the template by adding an FCM directive whenever the frame code mode changes between events;
XIII. Expand comments and directives in the Master List by creating the following directives if called for by the user:
   A. Freeze frame comments
   B. Clip name comments
   C. Patch comments
   D. Graphic offset comments
   E. Audio comments
   F. Strobe motion notes
   G. True speed notes
   H. SMPTE comments
   I. FCM directives
   J. Motion control directives
   K. Audio ¾ notes
   L. GPI directives
XIV. Update the title displayed to the user.
XV. Create the tape name to reel id assignment table is requested by the user;
XVI. Create an entry for each entry in the tape name table;
XVII. Generate the EDL text for each list in the EDL_Base:
   A. Mask out the mode field of each event with the channels currently selected;
   B. Find the currently selected template;
   C. Load the template into memory, if not loaded;
   D. Using the header section of the template, generate the EDL header;
   E. For each event in the list, recursively step through the EDL description tree and check for each of the following conditions:
      1. If the entry is a "template" check for the following:
         a. If the template is a static string, write it;
         b. If the template is a variable:
            1. Determine the variable type code;
            2. Determine the variable;
            3. Write the variable value based on its type;
         c. If the template calls for concatenation, do not write a space at the end of the entry, or else write one space plus additional spaces per template;
         d. If the template is a map, select the sub-template based on the map value;
XVIII. Display the resulting EDL lists on the system monitor;
XVIX. Convert the EDL list to an edit event component sequence:
   A. For each EDL entry in the Master List, create separate records for each channel in the edit;
   B. Add records to represent black edits where appropriate;
   C. Sort the list by channels;
   D. For each EDL record in the expanded Master List, create a component object in the sequence;
   E. Specify the title of the sequence from the EDL_Base title;
   F. Specify the record start of the sequence from the EDL_Base record start.

EDL Format Conversion

I. Accept and store the first format EDL_Base and Master List;

II. Free storage space associated with the old template description;
III. Load the new EDL template description tree into memory;
IV. Free the old EDL_Base text;
V. Combine directives in the Master List, where for each directive, merge the following into its associated event entry:
  A. Freeze frame comments
  B. Clip name comments
  C. Patch comments
  D. Graphic offset comments
  E. Audio comments
  F. Strobe motion notes
  G. True speed notes
  H. SMPTE comments
  I. FCM directives
  J. Motion control directives
  K. Audio ¾ notes
  L. GPI directives
VI. Remove FCM directives from the Master List;
VII. Add FCM directives if so called for by the new template description;
VIII. Expand comments and directives in the Master List by creating the following directives if called for by the user:
  A. Freeze frame comments
  B. Clip name comments
  C. Patch comments
  D. Graphic offset comments
  E. Audio comments
  F. Strobe motion notes
  G. True speed notes
  H. SMPTE comments
  I. FCM directives
  J. Motion control directives
  K. Audio ¾ notes
  L. GPI directives
IX. Generate the EDL text for each list in the EDL_Base:
  A. Mask out the mode field of each event with the channels currently selected;
  B. Find the currently selected template;
  C. Load the template into memory, if not loaded;
  D. Using the header section of the template, generate the EDL header;
  E. For each event in the list, recursively step through the EDL description tree and check for each of the following conditions:
    1. If the entry is a "template" check for the following:
      a. If the template is a static string, write it;
      b. If the template is a variable:
        1. Determine the variable type code;
        2. Determine the variable;
        3. Write the variable value based on its type;
      c. If the template calls for concatenation, do not write a space at the end of the entry, or else write one space plus additional spaces per template;
      d. If the template is a map, select the sub-template based on the map value;
X. Display the resulting EDL lists on the system monitor;
XI. Send the EDL text to the user-specified format, being one of the following:
  A. Computer file
  B. A CMX or GVG diskette
  C. A Sony or Macintosh diskette
  D. RS-232 Serial transmission line to an on-line video editing system.

These EDL management capabilities have been implemented using the an object-oriented extension of the C programming language, compiled on the C compiler. Once an EDL template has been "called up" for parsing or generating an EDL, the template typically requires approximately 150 Kbytes of memory in the system. The complete edit list management system may be implemented in other schemes or embodiments which are within the scope of the invention.

APPENDIX A

```
TITLE 4 BIT BATCH TEST EDL
0001 001    AA/V   C        04:00:00:00 04:00:23:27   01:00:00:00 01:00:23:2
0002 001    A2     C        04:04:08:10 04:05:04:19   01:00:23:27 01:01:20:0
0003 001    B      C        04:04:08:10 04:05:02:19   01:00:23:27 01:01:18:0
0004 001    A      C        04:08:02:21 04:08:07:27   01:01:18:06 01:01:23:1
0005 001    V      C        04:08:01:21 04:08:07:27   01:01:18:06 01:01:24:1
0006 001    A2     C        04:08:00:21 04:08:07:27   01:01:20:06 01:01:27:1
0007 001    A      C        04:02:28:05 04:02:49:21   01:01:23:12 01:01:44:2
0008 001    V      C        04:02:28:05 04:02:49:21   01:01:24:12 01:01:45:2
0009 001    A2     C        04:02:28:05 04:02:49:21   01:01:27:12 01:01:48:2
0010 001    A      C        04:07:45:25 04:07:54:09   01:01:44:28 01:01:53:1
0011 001    V      C        04:07:45:25 04:07:54:09   01:01:45:28 01:01:54:1
0012 001    A2     C        04:07:45:25 04:07:54:09   01:01:48:28 01:01:57:1
0013 001    A      C        04:06:10:21 04:07:01:06   01:01:53:12 01:02:43:2
0014 001    V      C        04:06:10:21 04:07:01:06   01:01:54:12 01:02:44:2
0015 001    A2     C        04:06:10:21 04:07:01:06   01:01:57:12 01:02:47:2
0016 001    A      C        04:08:32:04 04:09:43:29   01:02:43:27 01:03:55:2
0017 001    V      C        04:08:32:04 04:09:43:29   01:02:44:27 01:03:56:2
0018 001    A2     C        04:08:32:04 04:09:43:29   01:02:47:27 01:03:59:2
0019 001    A      C        04:07:20:02 04:07:40:06   01:03:55:22 01:04:15:2
0020 001    V      C        04:07:20:02 04:07:40:06   01:03:56:22 01:04:16:2
0021 001    A2     C        04:07:20:02 04:07:40:06   01:03:59:22 01:04:19:2
0022 001    A      C        04:03:34:11 04:04:00:17   01:04:15:26 01:04:42:0
0023 001    V      C        04:03:34:11 04:04:00:17   01:04:16:26 01:04:43:0
0024 001    A2     C        04:03:34:11 04:04:00:17   01:04:19:26 01:04:46:0
0025 001    A      C        04:00:02:27 04:00:23:27   01:04:42:02 01:05:03:0
0026 001    V      C        04:00:02:27 04:00:23:27   01:04:43:02 01:05:04:0
0027 001    A2     C        04:00:02:27 04:00:23:27   01:04:46:02 01:05:07:0
0028 001    A      C        04:02:57:20 04:03:23:13   01:05:03:02 01:05:28:2
0029 001    V      C        04:02:57:20 04:03:23:13   01:05:04:02 01:05:29:2
0030 001    A2     C        04:02:57:20 04:03:23:13   01:05:07:02 01:05:32:2
0031 001    A      C        04:00:00:00 04:00:23:27   01:05:28:25 01:05:52:2
0032 001    V      C        04:00:00:00 04:00:23:27   01:05:29:25 01:05:53:2
0033 001    A2     C        04:00:00:00 04:00:23:27   01:05:32:25 01:05:56:2
0034 001    A      C        04:04:08:10 04:05:04:19   01:05:52:22 01:06:49:0
0035 001    V      C        04:04:08:10 04:05:04:19   01:05:53:22 01:06:50:0
0036 001    A2     C        04:04:08:10 04:05:04:19   01:05:56:22 01:06:53:0
0037 001    A      C        04:08:00:21 04:08:07:27   01:06:49:01 01:06:56:0
0038 001    V      C        04:08:00:21 04:08:07:27   01:06:50:01 01:06:57:0
0039 001    A2     C        04:08:00:21 04:08:07:27   01:06:53:01 01:07:00:0
0040 001    A      C        04:02:28:05 04:02:49:21   01:06:56:07 01:07:17:2
0041 001    V      C        04:02:28:05 04:02:49:21   01:06:57:07 01:07:18:2
```

| | | | | | | | |
|---|---|---|---|---|---|---|---|
|0061|001|A|C|04:02:57:20|04:03:23:13|01:10:35:27|01:11:01:2|
|0062|001|V|C|04:02:57:20|04:03:23:13|01:10:36:27|01:11:02:2|
|0063|001|A2|C|04:02:57:20|04:03:23:13|01:10:39:27|01:11:05:2|
|0064|001|A|C|04:00:00:00|04:00:23:27|01:11:01:20|01:11:25:1|
|0065|001|V|C|04:00:00:00|04:00:23:27|01:11:02:20|01:11:26:1|
|0066|001|A2|C|04:00:00:00|04:00:23:27|01:11:05:20|01:11:29:1|
|0067|001|A|C|04:04:08:10|04:05:04:19|01:11:25:17|01:12:21:2|
|0068|001|V|C|04:04:08:10|04:05:04:19|01:11:26:17|01:12:22:2|
|0069|001|A2|C|04:04:08:10|04:05:04:19|01:11:29:17|01:12:25:2|
|0070|001|A|C|04:08:00:21|04:08:07:27|01:12:21:26|01:12:29:0|
|0071|001|V|C|04:08:00:21|04:08:07:27|01:12:22:26|01:12:30:0|
|0072|001|A2|C|04:08:00:21|04:08:07:27|01:12:25:26|01:12:33:0|
|0073|001|A|C|04:02:28:05|04:02:49:21|01:12:29:02|01:12:50:1|
|0074|001|V|C|04:02:28:05|04:02:49:21|01:12:30:02|01:12:51:1|
|0075|001|A2|C|04:02:28:05|04:02:49:21|01:12:33:02|01:12:54:1|
|0076|001|A|C|04:07:45:25|04:07:54:09|01:12:50:18|01:12:59:0|
|0077|001|V|C|04:07:45:25|04:07:54:09|01:12:51:18|01:13:00:0|
|0078|001|A2|C|04:07:45:25|04:07:54:09|01:12:54:18|01:13:03:0|
|0079|001|A|C|04:06:10:21|04:07:01:06|01:12:59:02|01:13:49:1|
|0080|001|V|C|04:06:10:21|04:07:01:06|01:13:00:02|01:13:50:1|
|0081|001|A2|C|04:06:10:21|04:07:01:06|01:13:03:02|01:13:53:1|
|0082|001|A|C|04:08:32:04|04:09:43:29|01:13:49:17|01:15:01:1|
|0083|001|V|C|04:08:32:04|04:09:43:29|01:13:50:17|01:15:02:1|
|0084|001|A2|C|04:08:32:04|04:09:43:29|01:13:53:17|01:15:05:1|
|0085|001|A|C|04:07:20:02|04:07:40:06|01:15:01:12|01:15:21:1|
|0086|001|V|C|04:07:20:02|04:07:40:06|01:15:02:12|01:15:22:1|
|0087|001|A2|C|04:07:20:02|04:07:40:06|01:15:05:12|01:15:25:1|
|0088|001|A|C|04:03:34:11|04:04:00:17|01:15:21:16|01:15:47:2|
|0089|001|V|C|04:03:34:11|04:04:00:17|01:15:22:16|01:15:48:2|
|0090|001|A2|C|04:03:34:11|04:04:00:17|01:15:25:16|01:15:51:2|
|0091|001|A|C|04:00:02:27|04:00:19:27|01:15:47:22|01:16:04:2|
|0092|001|V|C|04:00:02:27|04:00:23:27|01:15:48:22|01:16:09:2|
|0093|001|A2|C|04:00:02:27|04:00:23:27|01:15:51:22|01:16:12:2|
|0094|001|A|C|04:02:55:10|04:03:23:13|01:16:04:22|01:16:32:2|
|0095|001|V|C|04:02:57:20|04:03:23:13|01:16:09:22|01:16:35:1|
|0096|001|A2|C|04:02:57:20|04:03:23:13|01:16:12:22|01:16:38:1|
|0097|001|A|C|04:00:00:00|04:00:23:27|01:16:32:25|01:16:56:2|
|0098|001|V|C|04:00:00:00|04:00:23:27|01:16:35:15|01:16:59:1|
|0099|001|A2|C|04:00:00:00|04:00:23:27|01:16:38:15|01:17:02:1|
|0100|001|A|C|04:04:08:10|04:05:04:19|01:16:56:22|01:17:53:0|
|0101|001|V|C|04:04:11:20|04:05:04:19|01:16:59:12|01:17:52:1|
|0102|001|A2|C|04:04:08:10|04:05:04:19|01:17:02:12|01:17:58:2|
|0103|001|V|C|04:08:00:21|04:08:07:27|01:17:52:11|01:17:59:1|

| | | | | | | | |
|---|---|---|---|---|---|---|---|
| 0123 | 001 | A2 | C | 04:03:34:11 | 04:04:00:17 | 01:20:58:11 | 01:21:24:1 |
| 0124 | 001 | V | C | 04:00:02:27 | 04:00:23:27 | 01:21:18:07 | 01:21:39:0 |
| 0125 | 001 | A | C | 04:00:02:27 | 04:00:23:27 | 01:21:18:27 | 01:21:39:2 |
| 0126 | 001 | A2 | C | 04:00:02:27 | 04:00:23:27 | 01:21:24:17 | 01:21:45:1 |
| 0127 | 001 | V | C | 04:02:57:20 | 04:03:23:13 | 01:21:39:07 | 01:22:05:0 |
| 0128 | 001 | A | C | 04:02:57:20 | 04:03:23:13 | 01:21:39:27 | 01:22:05:2 |
| 0129 | 001 | A2 | C | 04:02:57:20 | 04:03:23:13 | 01:21:45:17 | 01:22:11:1 |
| 0130 | 001 | V | C | 04:00:00:00 | 04:00:23:27 | 01:22:05:00 | 01:22:28:2 |
| 0131 | 001 | A | C | 04:00:00:00 | 04:00:23:27 | 01:22:05:20 | 01:22:29:1 |
| 0132 | 001 | A2 | C | 04:00:00:00 | 04:00:23:27 | 01:22:11:10 | 01:22:35:0 |
| 0133 | 001 | V | C | 04:04:08:10 | 04:05:04:19 | 01:22:28:27 | 01:23:25:0 |
| 0134 | 001 | A | C | 04:04:08:10 | 04:05:04:19 | 01:22:29:17 | 01:23:25:2 |
| 0135 | 001 | A2 | C | 04:04:08:10 | 04:05:04:19 | 01:22:35:07 | 01:23:31:1 |
| 0136 | 001 | V | C | 04:08:00:21 | 04:08:07:27 | 01:23:25:06 | 01:23:32:1 |
| 0137 | 001 | A | C | 04:08:00:21 | 04:08:07:27 | 01:23:25:26 | 01:23:33:0 |
| 0138 | 001 | A2 | C | 04:08:00:21 | 04:08:07:27 | 01:23:31:16 | 01:23:38:2 |
| 0139 | 001 | V | C | 04:02:28:05 | 04:02:49:21 | 01:23:32:12 | 01:23:53:2 |
| 0140 | 001 | A | C | 04:02:28:05 | 04:02:49:21 | 01:23:33:02 | 01:23:54:1 |
| 0141 | 001 | A2 | C | 04:02:28:05 | 04:02:49:21 | 01:23:38:22 | 01:24:00:0 |
| 0142 | 001 | V | C | 04:07:45:25 | 04:07:54:09 | 01:23:53:28 | 01:24:02:1 |
| 0143 | 001 | A | C | 04:07:45:25 | 04:07:54:09 | 01:23:54:18 | 01:24:03:0 |
| 0144 | 001 | A2 | C | 04:07:45:25 | 04:07:54:09 | 01:24:00:08 | 01:24:08:2 |
| 0145 | 001 | V | C | 04:06:10:21 | 04:07:01:06 | 01:24:02:12 | 01:24:52:2 |
| 0146 | 001 | A | C | 04:06:10:21 | 04:07:01:06 | 01:24:03:02 | 01:24:53:1 |
| 0147 | 001 | A2 | C | 04:06:10:21 | 04:07:01:06 | 01:24:08:22 | 01:24:59:0 |
| 0148 | 001 | V | C | 04:08:32:04 | 04:09:43:29 | 01:24:52:27 | 01:26:04:2 |
| 0149 | 001 | A | C | 04:08:32:04 | 04:09:43:29 | 01:24:53:17 | 01:26:05:1 |
| 0150 | 001 | A2 | C | 04:08:32:04 | 04:09:43:29 | 01:24:59:07 | 01:26:11:0 |
| 0151 | 001 | V | C | 04:07:20:02 | 04:07:40:06 | 01:26:04:22 | 01:26:24:2 |
| 0152 | 001 | A | C | 04:07:20:02 | 04:07:40:06 | 01:26:05:12 | 01:26:25:1 |
| 0153 | 001 | A2 | C | 04:07:20:02 | 04:07:40:06 | 01:26:11:02 | 01:26:31:0 |
| 0154 | 001 | V | C | 04:03:34:11 | 04:04:00:17 | 01:26:24:26 | 01:26:51:0 |
| 0155 | 001 | A | C | 04:03:34:11 | 04:04:00:17 | 01:26:25:16 | 01:26:51:2 |
| 0156 | 001 | A2 | C | 04:03:34:11 | 04:04:00:17 | 01:26:31:06 | 01:26:57:1 |
| 0157 | 001 | V | C | 04:00:02:27 | 04:00:23:27 | 01:26:51:02 | 01:27:12:0 |
| 0158 | 001 | A | C | 04:00:02:27 | 04:00:23:27 | 01:26:51:22 | 01:27:12:2 |
| 0159 | 001 | A2 | C | 04:00:02:27 | 04:00:23:27 | 01:26:57:12 | 01:27:18:1 |
| 0160 | 001 | V | C | 04:02:57:20 | 04:03:23:13 | 01:27:12:02 | 01:27:37:2 |
| 0161 | 001 | A | C | 04:02:57:20 | 04:03:23:13 | 01:27:12:22 | 01:27:38:1 |
| 0162 | 001 | A2 | C | 04:02:57:20 | 04:03:23:13 | 01:27:18:12 | 01:27:44:0 |
| 0163 | 001 | V | C | 04:00:00:00 | 04:00:23:27 | 01:27:37:25 | 01:28:01:2 |
| 0164 | 001 | A | C | 04:00:00:00 | 04:00:23:27 | 01:27:38:15 | 01:28:02:1 |
| 0165 | 001 | A2 | C | 04:00:00:00 | 04:00:23:27 | 01:27:44:05 | 01:28:08:0 |

| | | | | | | | |
|---|---|---|---|---|---|---|---|
| 0185 | 001 | A  | C | 04:07:20:02 | 04:07:40:06 | 01:31:38:07 | 01:31:58:1 |
| 0186 | 001 | A2 | C | 04:07:20:02 | 04:07:40:06 | 01:31:43:27 | 01:32:04:0 |
| 0187 | 001 | V  | C | 04:03:34:11 | 04:04:00:17 | 01:31:57:21 | 01:32:23:2 |
| 0188 | 001 | A  | C | 04:03:34:11 | 04:04:00:17 | 01:31:58:11 | 01:32:24:1 |
| 0189 | 001 | A2 | C | 04:03:34:11 | 04:04:00:17 | 01:32:04:01 | 01:32:30:0 |
| 0190 | 001 | V  | C | 04:00:02:27 | 04:00:23:27 | 01:32:23:27 | 01:32:44:2 |
| 0191 | 001 | A  | C | 04:00:02:27 | 04:00:23:27 | 01:32:24:17 | 01:32:45:1 |
| 0192 | 001 | A2 | C | 04:00:02:27 | 04:00:23:27 | 01:32:30:07 | 01:32:51:0 |
| 0193 | 001 | V  | C | 04:02:57:20 | 04:03:23:13 | 01:32:44:27 | 01:33:10:2 |
| 0194 | 001 | A  | C | 04:02:57:20 | 04:03:23:13 | 01:32:45:17 | 01:33:11:1 |
| 0195 | 001 | A2 | C | 04:02:57:20 | 04:03:23:13 | 01:32:51:07 | 01:33:17:0 |
| 0196 | 001 | V  | C | 04:00:00:00 | 04:00:23:27 | 01:33:10:20 | 01:33:34:1 |
| 0197 | 001 | A  | C | 04:00:00:00 | 04:00:23:27 | 01:33:11:10 | 01:33:35:0 |
| 0198 | 001 | A2 | C | 04:00:00:00 | 04:00:23:27 | 01:33:17:00 | 01:33:40:2 |
| 0199 | 001 | V  | C | 04:04:08:10 | 04:05:04:19 | 01:33:34:17 | 01:34:30:2 |
| 0200 | 001 | A  | C | 04:04:08:10 | 04:05:04:19 | 01:33:35:07 | 01:34:31:1 |
| 0201 | 001 | A2 | C | 04:04:08:10 | 04:05:04:19 | 01:33:40:27 | 01:34:37:0 |
| 0202 | 001 | V  | C | 04:08:00:21 | 04:08:07:27 | 01:34:30:26 | 01:34:38:0 |
| 0203 | 001 | A  | C | 04:08:00:21 | 04:08:07:27 | 01:34:31:16 | 01:34:38:2 |
| 0204 | 001 | A2 | C | 04:08:00:21 | 04:08:07:27 | 01:34:37:06 | 01:34:44:1 |
| 0205 | 001 | V  | C | 04:02:28:05 | 04:02:49:21 | 01:34:38:02 | 01:34:59:1 |
| 0206 | 001 | A  | C | 04:02:28:05 | 04:02:49:21 | 01:34:38:22 | 01:35:00:0 |
| 0207 | 001 | A2 | C | 04:02:28:05 | 04:02:49:21 | 01:34:44:12 | 01:35:05:2 |
| 0208 | 001 | V  | C | 04:07:45:25 | 04:07:54:09 | 01:34:59:18 | 01:35:08:0 |
| 0209 | 001 | A  | C | 04:07:45:25 | 04:07:54:09 | 01:35:00:08 | 01:35:08:2 |
| 0210 | 001 | A2 | C | 04:07:45:25 | 04:07:54:09 | 01:35:05:28 | 01:35:14:1 |
| 0211 | 001 | V  | C | 04:06:10:21 | 04:07:01:06 | 01:35:08:02 | 01:35:58:1 |
| 0212 | 001 | A  | C | 04:06:10:21 | 04:07:01:06 | 01:35:08:22 | 01:35:59:0 |
| 0213 | 001 | A2 | C | 04:06:10:21 | 04:07:01:06 | 01:35:14:12 | 01:36:04:2 |
| 0214 | 001 | V  | C | 04:08:32:04 | 04:09:43:29 | 01:35:58:17 | 01:37:10:1 |
| 0215 | 001 | A  | C | 04:08:32:04 | 04:09:43:29 | 01:35:59:07 | 01:37:11:0 |
| 0216 | 001 | A2 | C | 04:08:32:04 | 04:09:43:29 | 01:36:04:27 | 01:37:16:2 |
| 0217 | 001 | V  | C | 04:07:20:02 | 04:07:40:06 | 01:37:10:12 | 01:37:30:1 |
| 0218 | 001 | A  | C | 04:07:20:02 | 04:07:40:06 | 01:37:11:02 | 01:37:31:0 |
| 0219 | 001 | A2 | C | 04:07:20:02 | 04:07:40:06 | 01:37:16:22 | 01:37:36:2 |
| 0220 | 001 | V  | C | 04:03:34:11 | 04:04:00:17 | 01:37:30:16 | 01:37:56:2 |
| 0221 | 001 | A  | C | 04:03:34:11 | 04:04:00:17 | 01:37:31:06 | 01:37:57:1 |
| 0222 | 001 | A2 | C | 04:03:34:11 | 04:04:00:17 | 01:37:36:26 | 01:38:03:0 |
| 0223 | 001 | V  | C | 04:00:02:27 | 04:00:23:27 | 01:37:56:22 | 01:38:17:2 |
| 0224 | 001 | A  | C | 04:00:02:27 | 04:00:23:27 | 01:37:57:12 | 01:38:18:1 |
| 0225 | 001 | A2 | C | 04:00:02:27 | 04:00:23:27 | 01:38:03:02 | 01:38:24:0 |
| 0226 | 001 | V  | C | 04:02:57:20 | 04:03:23:13 | 01:38:17:22 | 01:38:43:1 |
| 0227 | 001 | A  | C | 04:02:57:20 | 04:03:23:13 | 01:38:18:12 | 01:38:44:0 |

```
0247  001       V    C         04:08:32:04 04:09:43:29  01:41:31:12 01:42:43:0
0248  001       A    C         04:08:32:04 04:09:43:29  01:41:32:02 01:42:43:2
0249  001       A2   C         04:08:32:04 04:09:43:29  01:41:37:22 01:42:49:1
0250  001       V    C         04:07:20:02 04:07:40:06  01:42:43:07 01:43:03:1
0251  001       A    C         04:07:20:02 04:07:40:06  01:42:43:27 01:43:04:0
0252  001       A2   C         04:07:20:02 04:07:40:06  01:42:49:17 01:43:09:2
0253  001       V    C         04:03:34:11 04:04:00:17  01:43:03:11 01:43:29:1
0254  001       A    C         04:03:34:11 04:04:00:17  01:43:04:01 01:43:30:0
0255  001       A2   C         04:03:34:11 04:04:00:17  01:43:09:21 01:43:35:2
0256  001       V    C         04:00:02:27 04:00:23:27  01:43:29:17 01:43:50:1
0257  001       A    C         04:00:02:27 04:00:23:27  01:43:30:07 01:43:51:0
0258  001       A2   C         04:00:02:27 04:00:23:27  01:43:35:27 01:43:56:2
0259  001       V    C         04:02:57:20 04:03:23:13  01:43:50:17 01:44:16:1
0260  001       A    C         04:02:57:20 04:03:23:13  01:43:51:07 01:44:17:0
0261  001       A2   C         04:02:57:20 04:03:23:13  01:43:56:27 01:44:22:2
=> CONVERTED EDL. REEL NAME CONVERSIONS:
->    1002=001
```

APPENDIX B

Supported Numerical Types

```
typedef enum entry_t;
typedef enum wipe_t;
typedef enum directive_t;
typedef enum edl_key_t;
typedef enum source_t;
typedef enum record_t;
typedef enum fcm_t;
typedef enum mode_t;
typedef enum dm_t;
typedef enum delay_eff_t;
typedef enum split_t;
typedef enum tc_type_t;
typedef enum header_t;
typedef enum trailer_t;
typedef enum attrib_spec_t;
```

The EDL BASE Structure

```
struct edl_base
    {
    Boolean         fcm_override;
    Boolean         handle_split_in;
    Boolean         handle_split_out;
    Boolean         toupper_conversion;
    Boolean         pal_flag;
    Boolean         print_sourceuid_table;
    Boolean         clip_names;
    Boolean         patch_info;
    Boolean         parity_flag;
    Boolean         audio_34_option;

timecode_t      record_start;
    fmc_t           fcm_r;
    tc_type_t       time_code_type;
    header_t        header_type;
    trailer_t       trailer_type;
    attrib_spec_t   attributes;

long            max_reel_no;
```

```
        long            max_event_no;
        long            max_split_delay;
        long            max_channel_no;
        long            tape_name_len;

int             baud_rate;
        int             data_width;
        int             parity;
        int             stop_bits;
        int             handshaking;

char            *format_name;
        char            *title_string;
        char            *rev_no;
        char            *thru_rev_no;

struct edl      *edl;
        struct edl      *dupe_reel;
        struct edl      *effects_reel;
        struct edl      *tape_name_list;

TNT             *tape_name_tbl
};
```

The EDL Entry Structure

```
struct edl
        {
        timecode_t      a_src_st;
        timecode_t      a_src_end;
        timecode_t      b_src_st;
        timecode_t      b_src_end;
        timecode_t      k_src_st;
        timecode_t      k_src_end;
        timecode_t      rec_st;
        timecode_t      rec_end;
        timecode_t      k_rec_st;
        timecode_t      k_rec_end;
        timecode_t      delay_eff_st;
        timecode_t      duration_in_secs;

TNT             *a_source;
```

```
TNT            *b_source;
TNT            *k_source;

entry_t        entry_type;
wipe_t         wipe_code;
directive_t    directive_type;
key_t          key_type;
source_t       a_source_type;
source_t       b_source_type;
record_t       record_type;
delay_eff_t    delay_eff_type;
dm_t           dm_sign;
mode_t         orig_mode;
mode_t         mode;
mode_t         split_video_mode;
mode_t         split_audio_mode;
split_t        split_type;

long           duration_in_frames;
long           split_delay;
long           event_no;
long           k_up;
long           k_down;
long           k_delay;
long           speed_percent;
long           volume;
long           pan;

float          speed_fps;

Boolean        v_split_flag;
Boolean        a_split_flag;
Boolean        a1_split_flag;
Boolean        a2_split_flag;
Boolean        a3_split_flag;
Boolean        a4_split_flag;
Boolean        freeze_frame;
Boolean        recorded;

char           *comment_str;
char           *data_str;
char           *dir_str;
char           *reel_map;
```

```
    char            *clip_name;
    char            *patch_info;

struct edl      *next;
    struct edl      *prev;
    struct edl      *parts;
    struct edl      *comments;
    struct edl      *directives;
};
```

The Tape Name Table Entry Structure:

```
struct tnt
    {
    long            source_offset;
    long            reel_id;
    long            vref;
    long            dir_id;
    fcm_t           fcm;
    char            *dupe_reel;
    char            *tape_name;
    char            *full_name;
    char            *filename;
    sourceuid_t     source_uid;
    tnt             *next;
    }
```

EDL Internal Form:

The data structures above define the Avid Edit Decision List Internal form. It consists of two parts: an edl_base, and a doubly-linked list of edl entries. Together, these structures should be capable of describing a complete edit sequence. The edl_base structure holds global variables and flags which apply to the entire edit list. Each entry in the edit list describes an EDL entry. The entry can be a comment, title line, directive, or edit event. The entries are linked forwards and backwards, NULL terminated. These links allow entries to be merged, inserted, and sorted.

EDL Base Structure:

fcm_override
    Flag to indicate that an FCM directive overrides timecode
    indicators such as semi-colons.

handle_split_in
    Format is capable of handling split-ins.

handle_split_out
    Format is capable of handling split-outs.

toupper_conversion
    Flag to indicate that characters should be converted to
    upper case.

pal_flag
    Flag is true if timecodes are in PAL format. Alternative is
    is FALSE for NTSC timecodes.

print_sourceuid_table
    Flag is true if sourceuid conversion table is to be printed.

clip_names
    Flag is true if clip names are to be extracted from an Avid
    sequence and added to the list as comments.

patch_info
    Flag is true if patch information is to be extracted from an
    Avid sequence and added to the list as comments.

parity_flag
    Flag is true if characters should have the high bit set as
    parity on output.

audio_34_option
    Flag is true if format supports A3 and A4 audio channels.

record_start
    Starting record timecode.

fcm_r
    Frame code mode of the record master.

*time code type*
    This type field is used to indicate what kind of timecode should be used in generating EDL text. Supported forms include plain, semi-colons (GVG), period/commas (Sony) and SMPTE.

*header type*
    Some EDL files require a header of NULLs. This type indicates what kind of header should be used.

*trailer type*
    Some EDL files require trailing bytes of various kinds. This type indicates what pattern of trailer characters to use.

*attributes*
    A set of attribute flags largely used by edlGenerate().

*max reel no*
    The maximum reel number is used to indicate reel number precision .

*max event no*
    The maximum event number is used to indicate event number precision.

*max split delay*
    The maximum split delay used to test the supported limit of this delay in the given format.

*max channel no*
    Indicates the maximum number of audio channels supported by the format.

*tape name len*
    This length field is used to determine how many characters of a tape name can be used in the EDL text.

*baud rate*
    When transmitting the list via serial I/O, this quantity indicates the baud rate to be used.

*data width*
    When transmitting the list via serial I/O, this quantity indicates the data width to be used.

parity
When transmitting the list via serial I/O, this quantity indicates the parity type to be used.

stop_bits
When transmitting the list via serial I/O, this quantity indicates the number of stop bits to be used.

handshaking
When transmitting the list via serial I/O, this quantity indicates the handshaking protocol to be used.

format_name
The format name can be used in comments, etc.

title_string
Title string if present otherwise NULL.

rev_no
Revision number string if known or NULL.

thru_rev_no
Through revision number string if known or NULL.

edl
Pointer to edit decision list.

dupe_reel
Pointer to the dupe reel creation list.

effects_reel
Pointer to the effects reel creation list.

tape_name_list
Pointer to the tape name table list which is made from the tape name table (see below).

tape_name_tbl
Reel to tape name conversion table map if present otherwise NULL. Also contains sourceuid's for Avid conversion.

EDL Entry Structure:

<u>a_src_st</u>
   Starting timecode for A material.

<u>a_src_end</u>
   Ending timecode for A material.

<u>b_src_st</u>
   Starting timecode for B material.

<u>b_src_end</u>
   Ending timecode for B material.

<u>k_src_st</u>
   Starting timecode for key material.

<u>k_src_end</u>
   Ending timecode for key material.

<u>rec_st</u>
   Record start timecode.

<u>rec_end</u>
   Record end timecode.

<u>k_rec_st</u>
   Record start timecode for key material.

<u>k_rec_end</u>
   Record start timecode for key material.

<u>delay_eff_st</u>
   Delayed effect start timecode.

<u>duration_in_secs</u>
   Effect duration in abbreviated timecode form.

<u>a_source</u>
   A pointer to the tape name table. Largely used internally for aliased, indirect variables.

b_source
>   A pointer to the tape name table. Largely used internally for aliased, indirect variables.

k_source
>   A pointer to the tape name table. Largely used internally for aliased, indirect variables.

entry_type
>   Entry type indicates what kind of entry is present (comment, title, directive, cut, wipe, dissolve, or key).

wipe_code
>   SMPTE wipe code or zero.

directive_type
>   Directive type (fcm, swm, ms, gpi, m2, data, dm, or s3g) or zero.

key_type
>   The key type indicates what kind of key is present: simple, background, in, or out. Zero indicates no key.

a_source_type
>   Reel number, tape name, Blank, or Auxillary of A material.

b_source_type
>   Reel number, tape name, Blank, or Auxillary of B material.

record_type
>   Relation between sources and record VTR. Largely used by Paltex format.

dm_sign
>   Sign for dynamic memory. Can be plus, minus or blank.

mode
>   The mode field indicates what combination of video and audio are being manipulated by the edit. These mode codes vary quite a bit from format to format.

split_type

Indicates what type of split edit is contained.

duration_in_frames
   Effect duration in frames.

split_delay
   Delay time of a split edit. Positive number indicates split-out, negative number means split-in.

event_no
   Event number. Can be up to max_event_no.

k_up
   Fade up duration for key material.

k_down
   Fade down duration for key material.

k_delay
   Delay of key record start from event start.

speed_percent
   Source tape speed expressed as a percent. Can range from zero to 1000%. Negative speeds indicate reverse motion. Zero speed is used for freeze frame.

volume
   Volume level of the edit. There are 15 bits of volume level.

pan
   Pan amount (left). There is 15 bits of pan amount.

speed_fps
   Source tape speed expressed in frames per second. Can range from zero to ???. Negative speeds indicate reverse motion. Zero speed is used for freeze frame.

v_split_flag
   Indicates the presence of a video split edit. If TRUE, then split_v_st is active.

a_split_flag
   Indicates the presences of an audio split edit where all audio tracks are split toge: er. If TRUE, then split_a1_st indicates the start of the split.

a1_split_flag
Indicates the presence of a separate split on A1. If TRUE, then split_a1_st is active.

a2_split_flag
Indicates the presence of a separate split on A2. If TRUE, then split_a2_st is active.

a3_split_flag
Indicates the presence of a separate split on A3. If TRUE, then split_a3_st is active.

a4_split_flag
Indicates the presence of a separate split on A4 If TRUE, then split_a4_st is active.

audio_3_flag
Indicates the presence of audio channel 3 for this edit.

audio_4_flag
Indicates the presence of audio channel 4 for this edit.

freeze_frame
Indicates the presences of a freeze frame for this edit.

recorded
Indicates that this edit was recorded at some time.

comment_str
Comment string if present. Comments always precede an event in EDL.

data_str
Data strings are used to contain motion memory, or switcher memory data.

dir_str
Body of a directory command.

reel_map

Reel map entry line.

clip_name
  Clip name of the a source.

patch_info
  Source channel information.

next
  Pointer to next edl entry. List is NULL terminated.

prev
  Pointer to previous edl entry. List is NULL terminated in backwards direction also.

parts
  The parts sub-list.

comments
  The comments sub-list.

directives
  The directives sub-list.

Tape Name Table Entry Structure:

source_offset
  Offset in frames of the start of the source reference.

reel_id
  Reel id number associated with this source.

vref
  Volume reference number indicating location of source.

dir_id
  Directory reference number indicating location of source.

fcm
  Frame code mode indicating drop or non-drop source.

dupe_reel

Dupe reel letter designation, if any.

tape_name
Tape name associated with this source. This is the abbreviated form which complies with a particular format (given by tape_name_len in EDL base).

full_name
Full tape name associated with this source. This is the tape name stored in Avid' source manager database.

filename
File name of the source material on disk.

source_uid
Source id number associated with this source. This id number is used to locate and identify sources in Avid's source manager database.

next
The next tape name table entry.

Alias Timecode Variables split_v_st - aliased to a_src_st.
Split edit, V source start timecode.

split_a1_st - computed from a_src_st and split delay
Split edit, A1 source start timecode.

split_a2_st - computed from a_src_st and split delay
Split edit, A2 source start timecode.

split_a3_st - [reserved]
Split edit, A3 source start timecode.

split_a4_st - [reserved]
Split edit, A4 source start timecode.

split_a1_rec_st - computed from rec_st and split delay
Split edit, A1 record start timecode.

split_a2_rec_st - computed from rec_st and split delay

Split edit, A2 record start timecode.

split_a3_rec_st - [reserved]
Split edit, A3 record start timecode.

split_a4_rec_st - [reserved]
Split edit, A4 record start timecode.

split_delay_secs - computed from split_delay
Split day as a short timecode.

split_delay_full - computed from split_delay
Split day as a full timecode.

a_break_point - computed from a_src_st and k_delay.
Break point in a delayed key in.

k_cont_end - alias for k_rec_st.
This is used instead of k_rec_end for a continuous key in.

Alias Boolean Variables audio_3_flag - computed from mode
Flag is true if audio is present on channel 3.

audio_4_flag - computed from mode
Flag is true if audio is present on channel 4.

Alias String Variables a_filename - aliased through a_source to a tape name table entry
Name of a source media.

b_filename - aliased through b_source to a tape name table entry
Name of b source media.

k_filename - aliased through k_source to a tape name table entry
Name of key source media.

sa_tape_name - aliased through a_source to a tape name table entry
Tape name string for a source material.

sb_tape_name - aliased through b_source to a tape name table entry
Tape name string for b source material.

sk_tape_name - aliased through k_source to a tape name table entry
Tape name string for k source material.

sa_dupe_reel - aliased through a_source to a tape name table entry
Dupe reel letter for a source material.

sb_dupe_reel - aliased through b_source to a tape name table entry
Dupe reel letter for b source material.

Alias Long Variables a_vref - aliased through a_source to a tape name table entry
Volume reference number of a source media.

b_vref - aliased through b_source to a tape name table entry
Volume reference number of b source media.

k_vref - aliased through k_source to a tape name table entry
Volume reference number of key source media.

a_dir_id - aliased through a_source to a tape name table entry
Directory id number of a source media.

b_dir_id - aliased through b_source to a tape name table entry
Directory id number of b source media.

k_dir_id - aliased through k_source to a tape name table entry
Directory id number of key source media.

sa_reel_id - aliased through a_source to a tape name table entry
Reel id number for a source material.

sb_reel_id - aliased through b_source to a tape name table entry
Reel id number for b source material.

sk_reel_id - aliased through k_source to a tape name table entry
Reel id number for k source material.

fcm_a - aliased through a_source to fcm of TNT entry

Frame code mode for a source material.

fcm_b - aliased through b_source to fcm of TNT entry
Frame code mode for b source material.

fcm_k - aliased through k_source to fcm of TNT entry
Frame code mode for key source material.

Alias Other Variables sa_source_uid - aliased through a_source to a tape name table entry
Source uid for a source material.

sb_source_uid - aliased through b_source to a tape name table entry
Source uid for b source material.

sk_source_uid - aliased through k_source to a tape name table entry
Source uid for k source material.

APPENDIX C

```
CONTROL ROOT:
    fcm_override            TRUE            * FCM directives supercede semi-colons.
    handle_split_in         TRUE            * Handles split in edits.
    handle_split_out        FALSE           * Doesn't handle split out edits.
    toupper_conversion      TRUE            * Convert all comments and titles.
    pal_flag                FALSE           * NTSC version.
    print_sourceuid_table   FALSE           * Don't print this table.
    parity_flag             FALSE           * Don't set parity.
    time_code_type          1               * 1:plain, 2:semi, 3:comma, 4:smpte timeco
    header_type             2               * 0:None, 1:CMX, 2:Sony, 3:GVG header.
    trailer_type            2               * 0:None, 1:CMX, 2:Sony, 3:GVG trailer.
    max_reel_no             253             * Three digit reel numbers.
    max_event_no            999             * Three digit event numbers.
    max_split_delay         999             * Three digit splits.
    baud_rate               1               * 1:1200, 2:2400 3:4800 4:9600 baud.
    data_width              2               * 1: 7 bits, 2:8 bits wide.
    parity                  0               * 0:None, 1:Odd, 2:Even parity.
    stop_bits               1               * 1  or 2 stop bits.
    handshaking             1               * 0:None, 1:DTR, 2:XON handshaking.
    format_name             "CMX 3400"      * Name string.
    @MASTER                 "v1.0"          * Master format template.

TEMPLATE MASTER:
    @header
    <@entry_type>

TEMPLATE header:
    "TITLE:"
    comment_str
    TERM

MAP entry_type:
    @ax_dissolve            2               * Dissolve A to external source
    @xb_dissolve            3               * Dissolve external source to B
    @ab_dissolve            4               * Dissolve A to B
    @ax_wipe                5               * Wipe A to external source.
    @xb_wipe                6               * Wipe external soource to B
    @ab_wipe                7               * Wipe A to B
    @key_temp               8               * A key edit
    @x_cut                  10              * Cut to external source
    @cut_temp               11              * A cut edit.
    @directive_temp         17              * A directive.
```

```
        @comment              1             * A comment.

*   Templates for a dissolve edit.
*   Fade down.
TEMPLATE ax_dissolve:
    event_no
    sa_reel_id+
    (sa_dupe_reel)            1
    @mode
    "C        "
    a_src_st
    a_src_end                 1
    rec_st
    rec_end
    TERM
    event_no
    @b_source_type                          * BL or AX.
    @mode
    "D        "
    duration_in_frames        1
    b_src_st
    b_src_end                 1
    rec_st
    rec_end
    TERM

*   Fade down.
TEMPLATE xb_dissolve:
    event_no
    @a_source_type                          * BL or AX.
    @mode
    "C        "
    a_src_st
    a_src_end                 1
    rec_st
    rec_end
    TERM
    event_no
    sb_reel_id+
    (sb_dupe_reel)            1
    @mode
    "D        "
    duration_in_frames        1
    b_src_st
    b_src_end                 1
    rec_st
    rec_end
    TERM TEMPLATE ab_dissolve:
    event_no
    sa_reel_id+
    (sa_dupe_reel)            1
```

```
            @mode
            "C        "
            a_src_st
            a_src_end           1
            rec_st
            rec_end
            TERM
            event_no
            sb_reel_id+
            (sb_dupe_reel)      1
            @mode
            "D   "
            duration_in_frames  1
            b_src_st
            b_src_end           1
            rec_st
            rec_end
            TERM

*   Templates for a wipe edit.
TEMPLATE ax_wipe:
            event_no
            sa_reel_id+
            (sa_dupe_reel)      1
            @mode
            "C        "
            a_src_st
            a_src_end           1
            rec_st
            rec_end
            TERM
            event_no
            @b_source_type                  * BL or AX.
            @mode
            "W"+
            wipe_code
            duration_in_frames  1
            b_src_st
            b_src_end           1
            rec_st
            rec_end
            TERM TEMPLATE xb_wipe:
            event_no
            @a_source_type                  * BL or AX.
            @mode
            "C        "
            a_src_st
            a_src_end           1
            rec_st
            rec_end
            TERM
```

```
        event_no
        sb_reel_id+
        (sb_dupe_reel)      1
        @mode
        "W"+
        wipe_code
        duration_in_frames  1
        b_src_st
        b_src_end           1
        rec_st
        rec_end
        TERM TEMPLATE ab_wipe:
        event_no
        sa_reel_id+
        (sa_dupe_reel)      1
        @mode
        "C         "
        a_src_st
        a_src_end           1
        rec_st
        rec_end
        TERM
        event_no
        sb_reel_id+
        (sb_dupe_reel)      1
        @mode
        "W"+
        wipe_code
        duration_in_frames  1
        b_src_st
        b_src_end           1
        rec_st
        rec_end
        TERM

*   The following are valid key entries.
TEMPLATE key_temp:
        @key_type

MAP key_type:
        @key_in             16      * Key in
        @key_in_fade        17      * Key in with fade
        @key_in_delay       18      * Delayed key in
        @key_out            19      * Key out
        @key_out_fade       20      * key out with fade

*   Template for a key in event.
TEMPLATE key_in:
        event_no
        sa_reel_id+
        (sa_dupe_reel)      1
```

```
    @mode
    "K"
    "B     "
    a_src_st
    a_src_end          1
    rec_st
    rec_end
    TERM
    event_no
    sk_reel_id         1
    @mode
    "K    "
    k_up               1                    *  Fade up time, if any.
    k_src_st
    k_src_end          1
    k_rec_st
    k_rec_end
    TERM

*   Template for a key in with fade event.
TEMPLATE key_in_fade:
    event_no
    sa_reel_id+
    (sa_dupe_reel)     1
    @mode
    "K"
    "B "
    "(F)"
    a_src_st
    a_src_end          1
    rec_st
    rec_end
    TERM
    event_no
    sk_reel_id         1
    @mode
    "K    "
    k_up               1                    *  Fade up time, if any.
    k_src_st
    k_src_end          1
    k_rec_st
    k_rec_end
    TERM

*   Template for a key in with delay event.
TEMPLATE key_in_delay:
    event_no
    sa_reel_id+
    (sa_dupe_reel)     1
    @mode
    "C         "
    a_src_st
    a_src_end          1                    *  Should be a_srt_st + key_delay.
```

```
        rec_st
        k_rec_st
        TERM
        event_no
        sa_reel_id+
        (sa_dupe_reel)      1
        @mode
        "K"
        "B      "
        a_src_st
        a_src_end           1
        rec_st
        rec_end
        TERM
        event_no
        sk_reel_id          1
        @mode
        "K  "
        k_up                1              *  Fade up time, if any.
        k_src_st
        k_src_end           1
        k_rec_st
        k_rec_end
        TERM

*  Template for a key out event.
TEMPLATE key_out:
        event_no
        sa_reel_id+
        (sa_dupe_reel)      1
        @mode
        "K"
        "B      "
        a_src_st
        a_src_end           1
        rec_st
        rec_end
        TERM
        event_no
        sk_reel_id          1
        @mode
        "K"
        "O "
        k_up                1              *  Fade up time, if any.
        k_src_st
        k_src_end           1
        k_rec_st
        k_rec_end
        TERM

*  Template for key out with fade event.
TEMPLATE key_out_fade:
        event_no
```

```
    sa_reel_id+
    (sa_dupe_reel)      1
    @mode
    "K"
    "B "
    "(F)"
    a_src_st
    a_src_end           1
    rec_st
    rec_end
    TERM
    event_no
    sk_reel_id          1
    @mode
    "K"
    "O "
    k_up                1              * Fade up time, if any.
    k_src_st
    k_src_end           1
    k_rec_st
    k_rec_end
    TERM

*   Template for a cut edit.
TEMPLATE x_cut:
    event_no
    @a_source_type                     * BL or AX.
    @mode
    "C       "
    a_src_st
    a_src_end           1
    rec_st
    rec_end
    TERM

*   Template for cut or split edit.
TEMPLATE cut_temp:
    @split_type

MAP split_type:
    @simple_cut         0              * No split.
    @video_delay_split  1              * Video delayed.
    @audio_delay_split  2              * Audio delayed.

TEMPLATE simple_cut:
    event_no
    sa_reel_id+
    (sa_dupe_reel)      1
    @mode
    "C       "
    a_src_st
    a_src_end           1
    rec_st
```

```
        rec_end
        TERM

*   Template for a video delayed split edit.
TEMPLATE video_delay_split:
        "SPLIT:"                3
        "VIDEO"
        "DELAY="                1
        split_delay_full
        TERM
        event_no
        sa_reel_id              1
        @split_audio_mode
        "C         "
        split_a1_st
        a_src_end               1
        split_a1_rec_st
        rec_end
        TERM
        event_no
        sa_reel_id              1
        @split_video_mode
        "C         "
        a_src_st
        a_src_end               1
        rec_st
        rec_end
        TERM

*   Template for a audio delayed split edit.
TEMPLATE audio_delay_split:
        "SPLIT:"                3
        "AUDIO"
        "DELAY="                1
        split_delay_full
        TERM
        event_no
        sa_reel_id              1
        @split_video_mode
        "C         "
        a_src_st
        a_src_end               1
        rec_st
        rec_end
        TERM
        event_no
        sa_reel_id              1
        @split_audio_mode
        "C         "
        split_a1_st
        a_src_end               1
        split_a1_rec_st
        rec_end
```

```
    TERM

*   In the CMX 340 format, all unparsable lines are considered to be comments.
TEMPLATE comment:
    comment_str
    TERM

*   Map for channel modes.
MAP mode:
    "  NONE"          0          * No edit.
    "  V   "          1          * Video only
    "  A   "          2          * Audio 1 only
    "  B   "          3          * Video and Audio 1
    "  A2  "          4          * Audio 2 only
    "  A2/V"          5          * Video and Audio 2
    "  AA  "          6          * Audio 1 and 2 only
    "  AA/V"          7          * Video, Audio 1 and Audio 2
MAP split_video_mode:
    "  NONE"          0          * No edit.
    "  V   "          1          * Video only
    "  A   "          2          * Audio 1 only
    "  B   "          3          * Video and Audio 1
    "  A2  "          4          * Audio 2 only
    "  A2/V"          5          * Video and Audio 2
    "  AA  "          6          * Audio 1 and 2 only
    "  AA/V"          7          * Video, Audio 1 and Audio 2
MAP split_audio_mode:
    "  NONE"          0          * No edit.
    "  V   "          1          * Video only
    "  A   "          2          * Audio 1 only
    "  B   "          3          * Video and Audio 1
    "  A2  "          4          * Audio 2 only
    "  A2/V"          5          * Video and Audio 2
    "  AA  "          6          * Audio 1 and 2 only
    "  AA/V"          7          * Video, Audio 1 and Audio 2

*   Source type code.
MAP a_source_type:
    "  BL "           3          * Black
    "  AX "           4          * Auxillary line
MAP b_source_type:
    "  BL "           3          * Black
    "  AX "           4          * Auxillary line

*   An intermediate template used to hide map.
TEMPLATE directive_temp:
    @directive_type

*   The following are valid 3400 directives.
MAP directive_type:
    @fcm              2          * Frame code mode
    @swm              3          * Switcher memory
```

```
    @ms              4              * Master/slave
    @gpi             5              * General Purpose Inferace
    @m2              6              * Motion memory
    @data            7              * Motion data
    @info            9              * Information entry
    @source_entry    30             * Avid source table

*   Template for a Frame Code Mode directive.
TEMPLATE fcm:
    "FCM:  "
    @fcm_mode
    "FRAME"
    TERM

*   Map for Frame code modes.
MAP fcm_mode:
    "DROP"           3              * All drop frame mode
    "NON-DROP"       10             * All non-drop frame mode

*   Template for a Switcher Memory directive.
TEMPLATE swm:
    "SWM"
    dir_str
    TERM

*   Template for a Master/Slave directive.
TEMPLATE ms:
    "M/S"
    dir_str
    TERM

*   Template for a GPI directive.
TEMPLATE gpi:
    "GPI"
    dir_str
    TERM

*   Template for a motion memory directive.
TEMPLATE m2:
    "M2 "
    dir_str
    TERM

*   Template for a data entry.
TEMPLATE data:
    "%  "
    data_str
    TERM

*   Template for an information directive.
TEMPLATE info:
    ">>>"
    comment_str
```

What is claimed is:

1. A computer system for generating a video edit decision list comprising a formatted list of computer instructions for an edit controller for assembling a video program, wherein each instruction defines source material and a destination of a video editing event, the computer system comprising:

input means for receiving a representation of the video program as a sequence of edit events produced by a digital video editing system, selecting means, connected to the input means, for selecting one of a plurality of video edit decision list format specifiers, wherein each format specifier specifies a syntax of a video edit decision list of a different machine, generating means for generating, according to the sequence of edit events, the formatted list of computer instructions in the syntax specified by the selected video edit decision list format specifier, and output means, connected to the selecting means, for outputting the formatted list as the video edit decision list for use by the edit controller for assembling the video program.

2. The system of claim 1 further comprising storage means for storing the plurality of format specifiers in a template library.

3. The system according to claim 2, wherein the selecting means selects said selected one of said format specifiers from said template library.

4. The system of claim 1 wherein said output means comprises means for printing the video edit decision list.

5. The system of claim 1 wherein said output means comprises means for storing the video edit decision list.

6. The system of claim 1 wherein said output means comprises means for sending the video edit decision list to an output port.

7. The system of claim 1, wherein said input means includes:

video means for accepting a video to be edited;

editing means for manipulating the video to create editing events in the video and for generating said sequence of edit events.

8. The system of claim 7, wherein said video means includes digitizing means for digitizing an input signal to generate said video.

9. The system according to claim 1, wherein each of said format specifiers includes at least one model for specifying a video editing event in the corresponding format.

10. The system according to claim 1, wherein each of said format specifiers includes control information for the corresponding format.

11. The system according to claim 1, wherein each of said format specifiers includes at least one variable map for specifying a plurality of accepted values for a variable in the corresponding format.

12. The system of claim 1, wherein said input means includes:

receiving means for receiving a video edit decision list in a first format; and parsing means for generating said edit events based upon said first video edit decision list and a format specifier corresponding to said first format.

13. The computer system of claim 1, wherein a format specifier includes a control section defining global variables and flags indicating semantic choices for the format, and a list of entries, wherein each entry corresponds to one edit event.

14. A computer system for converting a first video edit decision list in a first syntax for a first machine, video editing event, to a second video edit decision list in a second syntax for a second machine, the computer system comprising:

input means for receiving the first video edit decision list for a video program, a format template library providing a plurality of format specifiers, each format specifier specifying a syntax of a video edit decision list for a different machine, including a first format specifier for the first syntax of a first machine and a second format specifier for the second syntax for the second machine, first selecting means, connected to the input means and format template library, for selecting the first format specifier in the format template library, first generating means for generating, according to the first video edit decision list and the first format specifier, a representation of the video program as sequence of edit events, second selecting means, connected to the first selecting means and format template library, for selecting the second format specifier in the format template library, second generating means for generating, according to the sequence of edit events and the second format specifier, a second video edit decision list in the second syntax, and output means, connected to the second selecting means, for outputting the second video edit decision list for use by the second machine.

15. The system of claim 14 wherein said input means comprises means for receiving the first video edit decision list at an input port.

16. The system of claim 14 wherein said input means comprises means for scanning a document on which the video edit decision list is printed.

17. The system of claim 14 wherein said input means comprises a retrieving means for retrieving a stored video decision list.

18. The system of claim 17 wherein said video edit decision list is encoded on a paper tape.

19. The computer system of claim 14, wherein a format specifier includes a control section defining global variables and flags indicating semantic choices for the format, and a list of entries, wherein each entry corresponds to one edit event.

20. A computer system for generating a representation of a video program as sequence of edit events to be used by a digital video editor for editing the video program, the computer system comprising:

input means for receiving a video edit decision list in a first syntax for a first machine, wherein the video edit decision list comprises a formatted list of computer instructions for an edit controller for assembling the video program, wherein each instruction defines source material and a destination of an edit event;

a format template library providing a plurality of format specifiers wherein each format specifier specifies a syntax of an edit decision list for a different machine, including a first format specifier for the first syntax, selecting means, connected to the input means and the format template library, for selecting the first format specifier in the format template library, and generating means for generating, according to the edit decision list and the first format specifier, the representation of the sequence of edit events corresponding to instructions in the video edit decision list.

21. The system of claim 20 wherein said input means comprises means for receiving the video edit decision list at an input port.

22. The system of claim 20 wherein said input means comprises means for scanning a document on which the video edit decision list is printed.

23. The system of claim 20 wherein said input means comprises means for retrieving a stored video edit decision list.

24. The system of claim 23 wherein said video edit decision list is encoded on a paper tape.

25. The system of claim 20, further comprising output means for making the sequence of edit events available to a digital video editor.

26. The system according to claim 20, wherein each of said format specifiers includes at least one model for specifying a video editing event in the corresponding format.

27. The system according to claim 20, wherein each of said format specifiers includes control information for the corresponding format.

28. The system according to claim 20, wherein each of said format specifiers includes at least one variable map for specifying a plurality of accepted values for a variable in the corresponding format.

29. The computer system of claim 20, wherein a format specifier includes a control section defining global variables and flags indicating semantic choices for the format, and a list of entries, wherein each entry corresponds to one edit event.

30. A computer implemented method for generating a video edit decision list, comprising a formatted list of computer instructions for an edit controller for assembling a video program, wherein each instruction defines source material and a destination of a video editing event, the method comprising the steps of:

receiving a representation of the video program as a sequence of edit events produced by a digital video editing system, selecting one of a plurality a video edit decision list format specifiers wherein each format specifier specifies a syntax of a video edit decision list of a different machine;

generating, according to the sequence of edit events, a formatted list of computer instructions in a syntax specified by the selected video edit decision list format specifier, and outputting the formatted list as the video edit decision list for use by the edit controller for assembling the video program.

31. The method of claim 30, wherein said receiving step includes the steps of:

accepting a video to be edited, manipulating the video to create editing events in the video, and generating a sequence of video and audio manipulations which each effect a particular one of the editing events.

32. The method of claim 31, wherein said accepting step includes digitizing an input signal to generate said video.

33. The computer-implemented method of claim 30, wherein a format specifier includes a control section defining global variables and flags indicating semantic choices for the format, and a list of entries, wherein each entry corresponds to one edit event.

34. A computer implemented method for converting a first video edit decision list in a first syntax for a first machine to a second video edit decision list in a second syntax for a second machine, wherein a video edit decision list comprises a formatted list of computer instructions for an edit controller for assembling a video program, wherein each instruction defines source material and a destination of a video editing event, the method comprising the steps of:

receiving the first video edit decision list for assembling a video program, selecting a first format specifier from a plurality of format specifiers, wherein each format specifier specifies a syntax of a video edit decision list for a different machine;

generating, according to the first video edit decision list and the first format specifier, a representation of the video program as sequence of edit events, selecting a second format specifier from the plurality of format specifiers;

generating, according to the sequence of edit events and the second format specifier, a formatted list of computer instructions, in the second syntax, and outputting the formatted list as the second video edit decision list.

35. The computer-implemented method of claim 34, wherein a format specifier includes a control section defining global variables and flags indicating semantic choices for the format, and a list of entries, wherein each entry corresponds to one edit event.

36. A computer implemented method for generating a representation of a video program as a sequence of edit events to be used by a digital video editor for editing the video program, the method comprising the steps of:

receiving a video edit decision list in a first syntax for a first machine wherein the video edit decision list comprises a formatted list of computer instructions for an edit controller for assembling the video program, wherein each instruction defines source material and a destination of an edit event;

selecting a format specifier from a plurality of format specifiers, wherein each format specifier specifies a syntax for a video edit decision list for a different machine;

generating, according to the video edit decision list and the selected format specifier corresponding to the first syntax, the sequence of edit events which corresponds to the video edit decision list.

37. The method of claim 36, further comprising the step of outputting the sequence of edit events to a digital video editor.

38. The computer-implemented method of claim 36, wherein a format specifier includes a control section defining global variables and flags indicating semantic choices for the format, and a list of entries, wherein each entry corresponds to one edit event.

* * * * *